US007004736B2

(12) United States Patent
Krassilnikov

(10) Patent No.: US 7,004,736 B2
(45) Date of Patent: Feb. 28, 2006

(54) METHOD AND APPARATUS FOR PRODUCING MOLDED ARTICLES

(75) Inventor: Valery Krassilnikov, Toronto (CA)

(73) Assignee: Talmolder Inc., Downsview (CA)

( * ) Notice: Subject to any disclaimer, the term of this patent is extended or adjusted under 35 U.S.C. 154(b) by 290 days.

(21) Appl. No.: 10/124,417

(22) Filed: Apr. 18, 2002

(65) Prior Publication Data
US 2003/0197296 A1 Oct. 23, 2003

(51) Int. Cl.
*B29C 33/34* (2006.01)
(52) U.S. Cl. .................... 425/60; 425/144; 425/145; 425/437
(58) Field of Classification Search ............... 425/144, 425/145, 435, 437, 588, 60
See application file for complete search history.

(56) References Cited

U.S. PATENT DOCUMENTS

| | | | |
|---|---|---|---|
| 3,601,853 A * | 8/1971 | Vox | 425/233 |
| 3,602,949 A | 9/1971 | Kaut | |
| 3,676,033 A | 7/1972 | Buonaiuto | |
| 3,712,771 A | 1/1973 | White et al | |
| 3,856,451 A | 12/1974 | Holzinger | |
| 4,043,721 A | 8/1977 | Lemelson | |
| 4,075,301 A | 2/1978 | Oswald | |
| 4,257,755 A * | 3/1981 | Lemelson | 425/168 |
| 4,370,124 A * | 1/1983 | Buja | 425/556 |
| 4,486,367 A | 12/1984 | Shimomura | |
| 4,495,120 A | 1/1985 | Shimomura | |
| 4,671,753 A | 6/1987 | Payne | |
| 4,853,166 A * | 8/1989 | Andersen et al. | 264/46.5 |
| 4,943,221 A * | 7/1990 | Friesen | 425/73 |
| 4,956,133 A | 9/1990 | Payne | |
| 5,316,701 A | 5/1994 | Payne | |
| 6,030,557 A | 2/2000 | Payne | |
| 6,090,318 A * | 7/2000 | Bader et al. | 264/40.1 |
| 6,267,917 B1 | 7/2001 | Guzikowski et al | |
| 6,715,535 B1 * | 4/2004 | Kahn et al. | 164/136 |

* cited by examiner

*Primary Examiner*—Allan R. Kuhns
(74) *Attorney, Agent, or Firm*—Philip C. Mendes da Costa; Bereskin & Parr

(57) ABSTRACT

A molding station has a housing support and a housing. The housing has a generally horizontal axis, a plurality of mold cavity enclosures and a plurality of sides. The housing is rotatably mounted to the housing support about the generally horizontal axis. The mold cavity enclosures are circumferentially positioned about the axis in at least some of the sides. Each mold cavity enclosure defines at least one mold cavity.

33 Claims, 21 Drawing Sheets

METHOD AND APPARATUS FOR PRODUCING MOLDED ARTICLES

FIELD OF THE INVENTION

The invention relates to molding systems and a molding system and station for producing several molded articles simultaneously.

BACKGROUND OF THE INVENTION

Molded articles, such as those that have an internal cell structure and that are produced by curing a molding material in a mold cavity, are typically produced by a molding system having several stations, whereby the mold cavity enclosure is filled at a first station, the mold cavity enclosure is then transported to a second station at which the molding material is heated or cooled, and mold cavity enclosure is then transported to a third station at which the molded article is removed from the enclosure. Such molding systems typically occupy a relatively large amount of space.

Articles having an open foam structure (whereby the molding material is essentially molded at atmospheric pressure) are typically produced on a conveyor belt system. The molding material is poured onto the belt as the belt is moving. Sidewalls positioned on the surface near the sides of the belt contain the molding material. The molding material is contained only by the belt and the sidewalls, and may expand freely upwards. This process produces long slabs of open foam product, which is then machined to remove the dimensionally uncontrolled portion on top. The final slab may then be machined as desired to produce a final open-cell structure product. Typically, this process is time-consuming, and produces a significant amount of waste due to the removal of the topmost portion, and also during the later machining steps to produce a final product.

SUMMARY OF THE INVENTION

In accordance with one aspect of the instant invention, there is provided a molding station comprising a housing support; a housing having a generally horizontal axis, a plurality of mold cavity enclosures and a plurality of sides, the housing being rotatably mounted to the housing support about the generally horizontal axis, the mold cavity enclosures being circumferentially positioned about the axis in at least some of the sides, each of the mold cavity enclosures defining at least one mold cavity; and, at least one temperature control device in thermal communication with at least some of the mold cavity enclosures.

In one embodiment, each mold cavity enclosure has an opening and an associated lid which is movably mounted between a first position wherein each lid closes a respective opening and a second position wherein access is provided to the respective at least one of the mold cavity enclosures, and the opening is accessible from above when the associated lid is in the open position.

In another embodiment, the housing has an upper side and as the housing is rotated about the axis, each side of the housing is positionable to be the upper side and the molding station further comprises a lid opener, the opener opening a lid of a mold cavity enclosure when the respective mold cavity enclosure is positioned in the side of the housing which is then the upper side of the housing.

In another embodiment, each mold cavity enclosure includes a first mold portion and a second mold portion, the first mold portion is mounted to the housing and the second mold portion is mounted to the associated lid.

In another embodiment, the at least one temperature control device is in thermal communication with each mold cavity enclosure.

In another embodiment, each mold cavity enclosure comprises a single mold cavity.

In another embodiment, the housing has an upper side and as the housing is rotated about the axis, each side of the housing is positionable to be the upper side and the molding station further comprises a pressurized gas outlet positioned in a lower portion of a mold cavity enclosure when the mold cavity enclosure is positioned such that the mold cavity enclosure is provided in the then upper side of the housing, the pressurized gas outlet connected to a selectively activatable source of pressurized gas wherein a pressurized gas is injected into the mold cavity enclosure to loosen a molded product from the enclosure when the source is activated.

In another embodiment, the molding station further comprises a flexible hose member connected to a selectively activatable source of pressurized gas wherein a pressurized gas is injected into the mold cavity enclosure to loosen a molded product from the enclosure when the source is activated.

In another embodiment, the housing has an interior volume and two opposing side faces, at least one of the side faces having a passage to the interior volume from exterior of the housing, and, the temperature control device includes a first portion that is positioned within the interior volume, and a second portion that is positioned outside of the housing, the first and second portions being connected to each other through the passage.

In another embodiment, the temperature control device is an electrical resistance heater including a heatable resistance element that is connectable to an electrical source through a passage in the housing.

In another embodiment, the temperature control system includes a fluid conduit passing into and out of the interior volume through the passage, the fluid conduit being adapted to transport fluid at a selected temperature, into and out of the interior volume, the fluid conduit having an inlet that is connectable to a source of fluid at the selected temperature and a fluid pump for moving the fluid through the conduit from the source.

In another embodiment, the molding station further comprises at least one additional housing having a generally horizontal axis, a plurality of mold cavity enclosures, each of the housings is rotatable about the axis between a plurality of feeding positions wherein in each of the feeding positions at least one of the mold cavity enclosures is adapted to be filled; and, an overhead feeding system, the overhead feeding system including a molding material transport conduit, the molding material transport conduit having an inlet and an outlet, the inlet being connectable to a source of molding material, the outlet being selectively positionable above each of the housings.

In another embodiment, the molding station further comprises a control system, the control system being adapted to feed a selected amount of molding material from the outlet into a mold cavity enclosure when the housing is in one of the feeding positions and the overhead feeding system is positioned above the housing.

In another embodiment, the control system is adapted to rotate the housings around the axis between each feeding position and to move the overhead feeding system between each of the housings whereby the overhead feeding system fills one mold cavity enclosure in each housing before filling a second mold cavity enclosure in one of the housings.

In another embodiment, each housing is independently rotatable.

In accordance with another aspect of the instant invention, there is also provided a molding station comprising a plurality of housings, each housing having a generally horizontal axis and a plurality of mold cavity enclosures circumferentially positioned about the axis, each of the housings is rotatable about its axis between a plurality of feeding positions wherein in each of the feeding positions at least one of the mold cavity enclosures is adapted to be filled from above; and, an overhead feeding system, the overhead feeding system including a molding material transport conduit, the molding material transport conduit having an inlet and an outlet, the inlet being connectable to a source of molding material, the outlet being selectively positionable above each of the housings.

In one embodiment, the molding station further comprises a control system, the control system being adapted to feed a selected amount of molding material from the outlet into a mold cavity enclosure when the housing is in one of the feeding positions and the overhead feeding system is positioned above the housing.

In another embodiment, the control system is adapted to rotate the housings around the axis between each feeding position and to move the overhead feeding system between each of the housings whereby the overhead feeding system fills one mold cavity enclosure in each housing before filling a second mold cavity enclosure in one of the housings.

In another embodiment, each housing is independently rotatable.

In accordance with another aspect of the instant invention, there is also provided a method of molding articles from a feed material, the method comprising providing a plurality of housings, each of the housing having a plurality of mold cavity enclosures and a generally horizontal axis; opening a first of the mold cavity enclosures in a first of the housings and providing the first mold cavity enclosure with the feed material from a feeder; closing the first mold cavity enclosure and providing a first mold cavity enclosure of a second housing with the feed material from the feeder; and, rotating the first housing about the generally horizontal axis so as to position a second mold cavity enclosure of the first housing for receiving feed material.

In one embodiment, the feeder is movably positioned above the housings and the method further comprises moving the feeder from a position above the first housing to a position above the second housing so that the feeder is positioned to provide feed material to the first mold cavity enclosure of the second housing.

In another embodiment, the method further comprises providing feed material to each first mold cavity enclosure of each housing prior to providing feed material to a second mold cavity of one of the housings.

In another embodiment, the method further comprises moving the feeder so as to sequentially provide feed material to each of the first mold cavity enclosures.

In another embodiment, the method further comprises independently rotating each of the housings to position a further mold cavity enclosure for receiving feed material as the feeder is moved above the housings.

In another embodiment, each mold cavity enclosure has a temperature that varies and the method further comprises adjusting the temperature of each of the mold cavity enclosures of a single housing by a heat transfer member positioned in thermal contact with each of the mold cavity enclosures of a single housing.

In another embodiment, the method further comprises injecting air underneath an article to assist in removing the article from a mold cavity enclosure before new feed material is provided in the mold cavity enclosure.

In accordance with another aspect of the instant invention, there is also provided a molding station comprising housing means rotatably mounted about a generally horizontal axis and having a plurality of mold cavity means and a plurality of sides, the mold cavity means being circumferentially positioned about the axis in at least some of the sides; and, temperature control means in thermal communication with at least some of the mold cavity means.

In one embodiment, each mold cavity means has a lid that is openable to provide access to the mold cavity from above.

In another embodiment, the at least one temperature control means is in thermal communication with each mold cavity means.

In another embodiment, the molding station further comprises pressurized gas delivery means provided in at least some of the mold cavity means.

In another embodiment, the temperature control means comprises a heat exchanger provided interior of the mold cavity means of a single housing means.

In another embodiment, the molding station further comprises at least one additional housing means rotatable about a generally horizontal axis; and, an overhead feeding means for filling a mold cavity means when the mold cavity means is open.

In another embodiment, the molding station further comprises control means adapted to feed a selected amount of molding material from the overhead feeding means into a mold cavity means when the mold cavity means is open and the overhead feeding means is positioned above the open mold cavity means.

In another embodiment, the control means is adapted to rotate the housing means around the axis and to move the overhead feeding system between each of the housing means whereby the overhead feeding means fills one mold cavity means in each housing means before filling a second mold cavity means in one of the housings means.

In another embodiment, each housing means is independently rotatable.

In accordance with another aspect of the instant invention, there is also provided a molding station comprising a plurality of housing means rotatably mounted about a generally horizontal axis and having a plurality of mold cavity means and a plurality of sides, the mold cavity means being circumferentially positioned about the axis in at least some of the sides; and, an overhead feeding means for filling a mold cavity means when the mold cavity means is open.

In one embodiment, the molding station further comprises control means adapted to feed a selected amount of molding material from the overhead feeding means into a mold cavity means when the mold cavity means is open and the overhead feeding means is positioned above the open mold cavity means.

In another embodiment, the control means is adapted to rotate the housing means around the axis and to move the overhead feeding system between each of the housing means whereby the overhead feeding means fills one mold cavity means in each housing means before filling a second mold cavity means in one of the housings means.

In another embodiment, each housing means is independently rotatable.

In accordance with another aspect of the instant invention, there is also provided a mold cavity enclosure comprising a first mold cavity portion; a second mold cavity portion, the first and second mold cavity portions being movable between a first position wherein the first and second mold cavity portions mate together to define the mold cavity enclosure and a second position wherein the first and second mold portions are open whereby a molded article is removable from the mold cavity; and, the mold cavity enclosure having at least one slot, the mold cavity enclosure is substantially enclosed by the mold cavity portions except the at least one slot where the mold cavity enclosure is open to the atmosphere during curing of molding material in the mold cavity enclosure.

In one embodiment, the mold cavity is configured to produce a molded article having a length, a width and a thickness, the molded article having a surface that extends in the length and width dimension, the shape of the surface being substantially defined by the mold cavity.

In another embodiment, at least one of the dimensions of the slot is the thickness of the molded article.

In another embodiment, the mold cavity surrounds at least about 90% of a molded article produced in the mold cavity.

In accordance with another aspect of the instant invention, there is also provided a cassette configured to receive a plurality of mold cavity enclosures, the mold cavity enclosures comprising a first mold cavity portion; a second mold cavity portion, the first and second mold cavity portions being movable between a first position wherein the first and second mold cavity portions mate together to define the mold cavity enclosure and a second position wherein the first and second mold portions are open whereby a molded article is removable from the mold cavity; and, the mold cavity enclosure having at least one slot, the mold cavity enclosure is substantially enclosed by the mold cavity portions except the atleast one slot where the mold cavity enclosure is open to the atmosphere during curing of molding material in the mold cavity enclosure, the cassette comprising a support shelf; and, a plurality of upstanding dividers mounted on said support shelf, wherein each pair of adjacent dividers defines a slot for receiving one of the mold cavity enclosures in an upright orientation with the opening facing upwards.

In accordance with another aspect of the instant invention, there is also provided a molding station for receiving a plurality of cassettes, each cassette configured to receive a plurality of mold cavity enclosures, the cassettes comprising a support shelf and a plurality of upstanding dividers mounted on said support shelf, wherein each pair of adjacent dividers defines a slot for receiving one of the mold cavity, wherein the molding station comprises a housing support; and, a housing having a generally horizontal axis, the housing being rotatably mounted to the housing support about the generally horizontal axis, the housing having a plurality of sides, a plurality of shelves, each shelf being adapted for supporting one of the cassettes, the shelves being circumferentially positioned about the axis in at least some of the sides, the housing including locking means for retaining the cassettes on the shelves during rotation of the housing.

BRIEF DESCRIPTION OF THE DRAWINGS

For a better understanding of the present invention and to show more clearly how it may be carried into effect, reference will now be made by way of example to the accompanying drawings, showing a molding station in accordance with preferred embodiments of the present invention, in which.

DESCRIPTION OF THE PREFERRED EMBODIMENT

Figure 1:
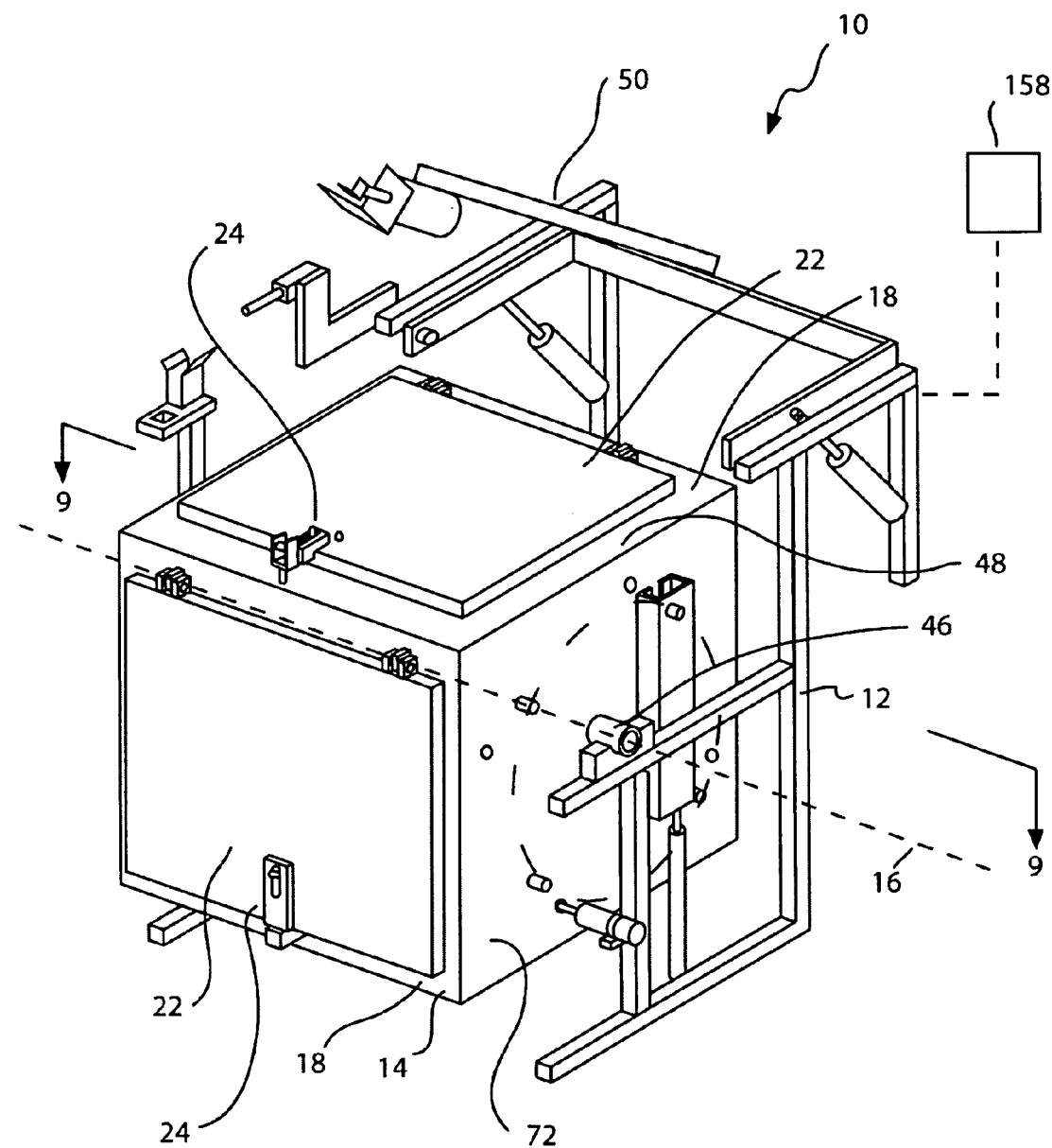
FIG. 1 is a perspective view of a molding station in accordance with a first embodiment of the present invention.

Reference is made to FIG. 1, which shows a molding station 10 in accordance with a first embodiment of the present invention. Molding station 10 may be used for producing a plurality of molded articles simultaneously as discussed herein. Molding station 10 includes a housing support 12 and housing means, such as a housing 14.

The housing 14 is rotatably mounted to the housing support 12. The housing 14 is rotatable about a generally horizontal axis 16. Housing 14 has a plurality of sides 18 circumferentially positioned about the axis 16, and a plurality of mold cavity means, such as mold cavity enclosures 20 having opening 21.

As shown in FIG. 1, each housing may have four sides. However, it will be appreciated by those skilled in the art that the number of sides may vary. For example, a housing 14 may have only 2 or 3 sides or it may have 5 or more sides. Preferably, the number of sides is selected based on the amount of time required to cure the feed material placed in mold cavity enclosures 20 to a point at which a molded article may be removed therefrom. In accordance with a preferred mode of operation, a first mold cavity enclosure is positioned in a feed position, is filled with the feed material and the lid is closed. The housing 14 is then rotated so that a further mold cavity enclosure 20 may be filled after other mold cavity enclosures 20 in other housings 14 are filled. Eventually, the first mold cavity enclosure 20 is returned to the feed position and a cured molded article is removed. Accordingly, the amount of time it takes a single mold cavity enclosure 20 to make a full rotation is about the same as the amount of time required to cure the feed material placed in mold cavity enclosures 20. Therefore the slower the cure time, the larger the number of sides 18 that may be provided. It will also be appreciated that each side 18 may have one of the mold cavity enclosures 20 positioned thereon. Alternatively, some sides may have more than one mold cavity enclosure thereon and some sides may be void of mold cavity enclosures 20. Further, during a particular operation cycle, not all mold cavity enclosures need be filled. Overall, it is preferred that the number of enclosures 20 and sides 18 that are utilized are sufficient such that molded articles may be removed after a single rotation of housing 14.

Figure 2:
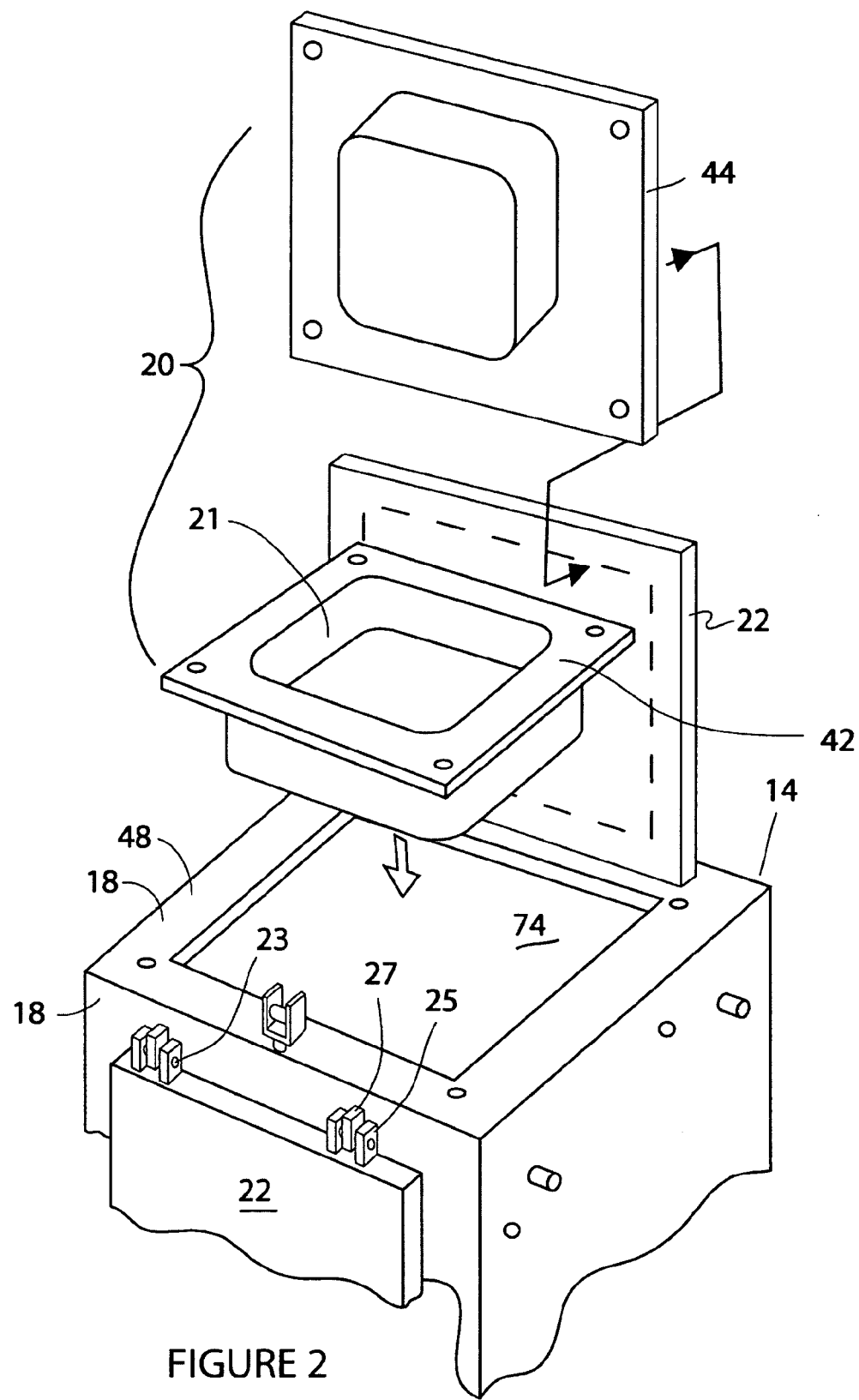
FIG. 2 is a perspective view of the molding station shown in FIG. 1, with the lid open.

Each side 18 may have an associated lid 22, which is movably connected to the housing 14 by any means known in the art such as by means of a pivot. For example, as shown in FIG. 2, lid 22 has flanges 25 and housing 14 has a flange 27. An opening for receiving shaft 23 is provided through flanges 25 and 27 so that lid 22 is rotatable about shaft 23. Alternately, lid may be moved upwardly away from opening 21 and then displaced sideways with respect thereto. In any event, lid 22 may be movable between a first or closed position wherein lid 22 is closed and prevents access to the mold cavity enclosure 20 (see for example FIG. 1), and a second or open position, wherein lid 22 is open and permits access to the mold cavity enclosure 20 (see for example FIG. 2). Lid 22 closes mold cavity enclosure 20 so that the feed material stays therein while housing 14 is rotated and the feed material cures. If the feed material rapidly cured to form a skin that retained the feed material in mold cavity enclosure 20 as housing 14 is rotated, then a lid 22 may not be required.

Lid 22 may be movable between the first and second positions by any means known in the art. For example, lid 22 may be manually moved by an operator or is may be moved by lid opener 50. Lid opener 50 may be manually actuated when housing 14 is rotated to a preset feed position or it may be manually actuatable by an operator. Further, lid 22 may be held in the first, closed position by any suitable means, such as, for example, a manually operable lock, an automatic lock or even by a hydraulic cylinder of a lid opener 50.

Figure 3:
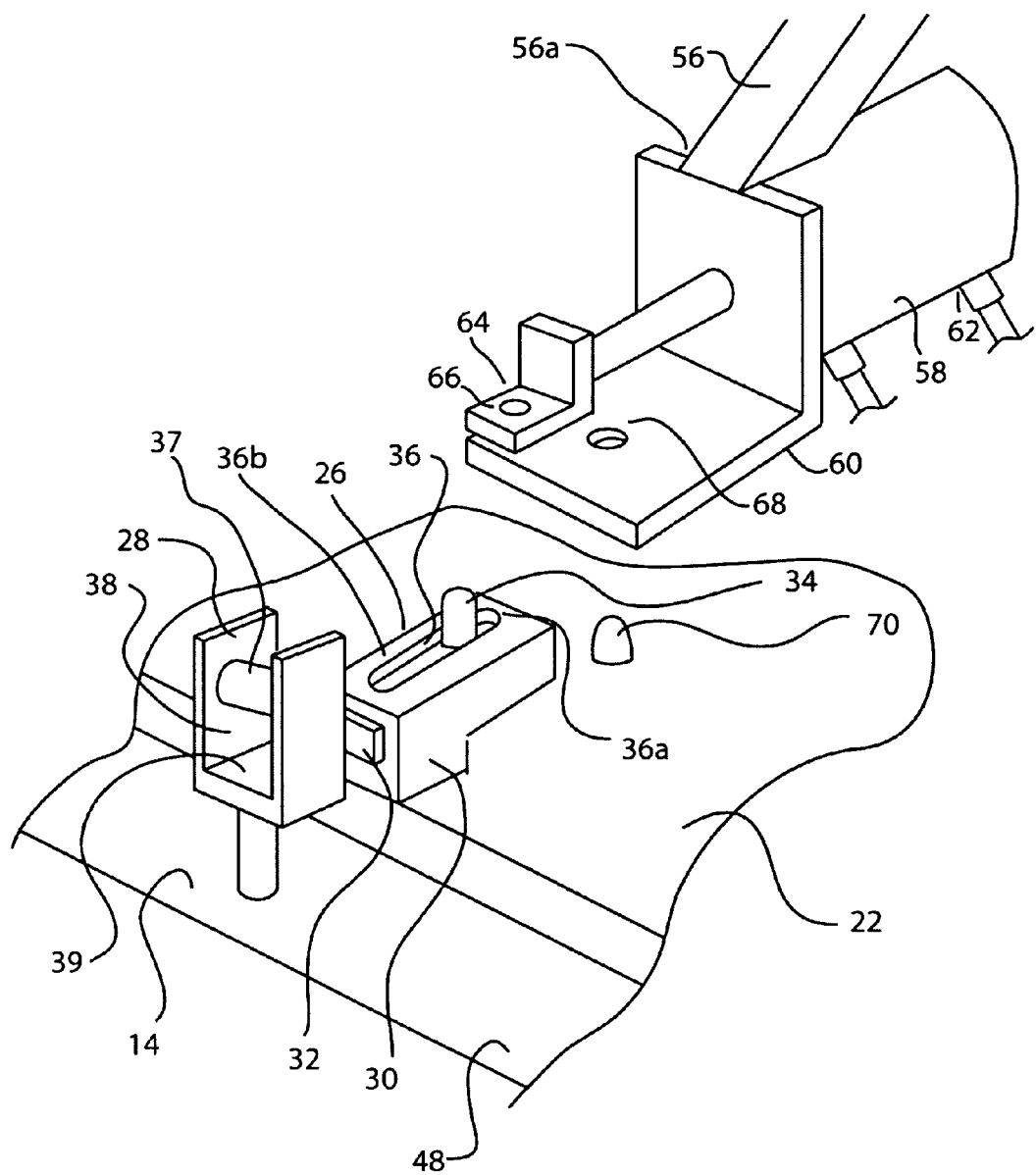
FIG. 3 is a perspective view of the lock on the molding station shown in FIG. 1.
Figure 4:
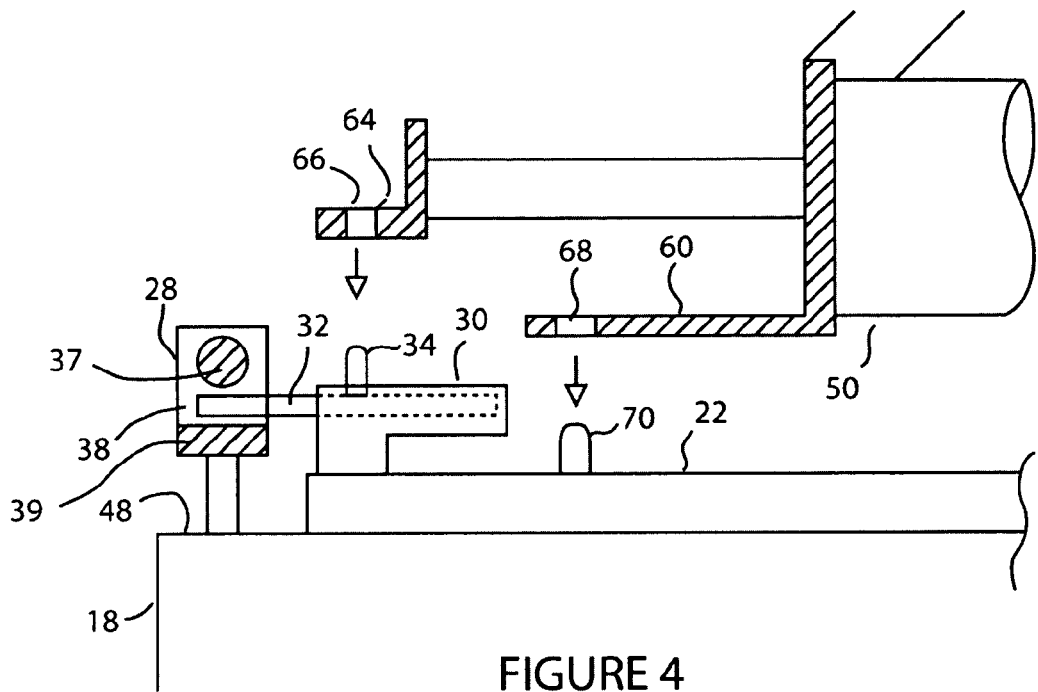
FIGS. 4 and 5 are side views illustrating the operation of the lock shown in FIG. 3.
Figure 5:
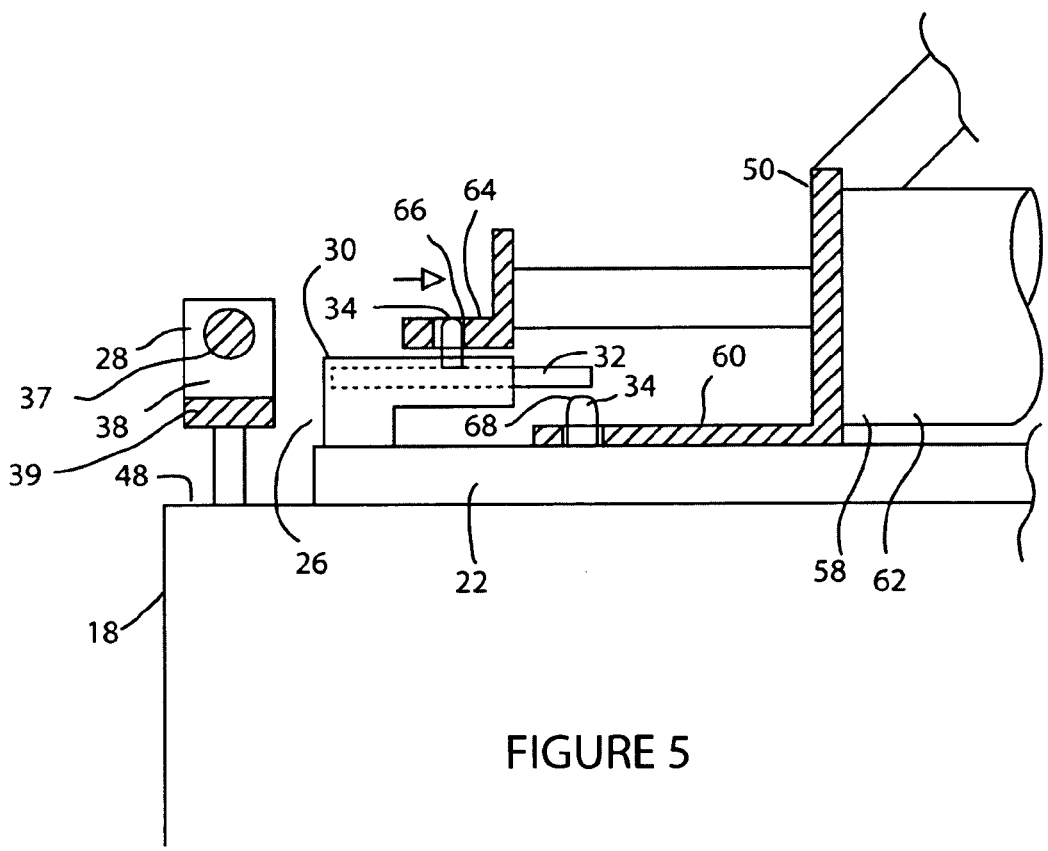

An example of an automatic lock 24 is shown more clearly in FIGS. 3, 4 and 5. Lock 24 may comprise a deadbolt assembly 26 and a deadbolt-receiving piece 28. The deadbolt assembly 26 is fixed to lid 22, and may include a tube piece 30 and a sliding deadbolt 32 slidably positioned therein. A boss 34 on the deadbolt 32 may be positioned in and guided by a closed-ended slot 36 on the tube piece 30. The travel of the deadbolt 32 may be limited by the cooperation of the boss 34 and opposed ends 36a and 36b of closed-ended slot 36. The deadbolt-receiving piece 28 is fixed to the housing 14 and has spaced apart members (e.g. rod 37 and base 39) to define an aperture 38 for receiving the deadbolt 32.

The deadbolt 30 may slide from a first, locked position wherein it extends through the aperture 36 to lock lid 22 closed, (see FIG. 4), to a second, unlocked position wherein it is retracted from the aperture 36, permitting lid 22 to be opened (see FIG. 5).

Figure 6:
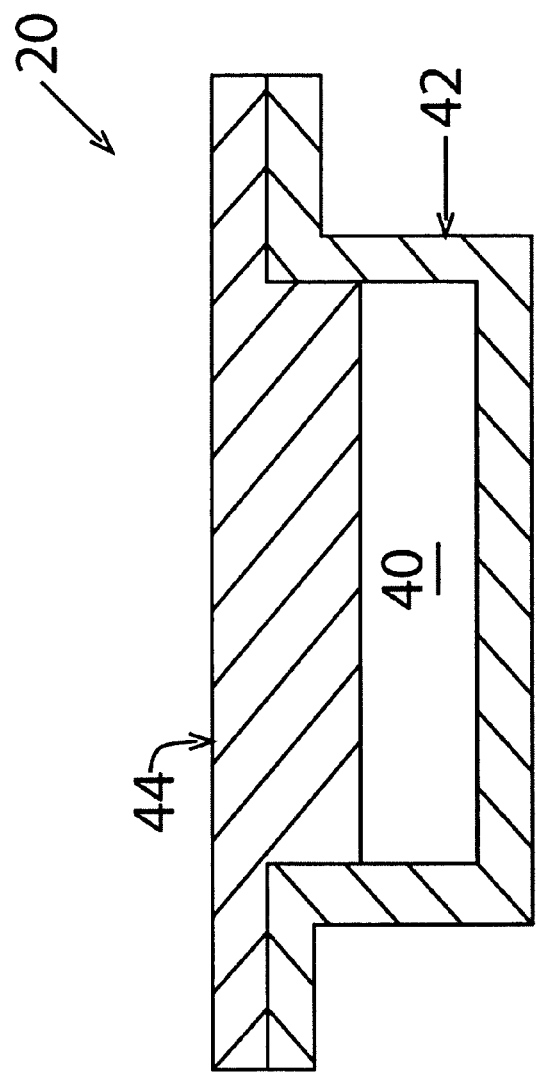
FIG. 6 is a sectional side view of the mold cavity enclosure shown in FIG. 2.

Referring to FIG. 6, each mold cavity enclosure 20 defines at least one mold cavity 40 therein. Mold cavity enclosure 20 may be divided into a lower mold portion 42 and an upper mold portion 44, which mate together to define mold cavity 40. The lower and upper mold portions 42 and 44 mate together releasably, to permit access to the mold cavity 40. The lower mold portion 42 may be releasably connected to the housing 14 by any means known in the art, and the upper mold portion 44 may be releasably connected to the lid 22 by any means known in the art (see FIG. 2).

In the embodiment of FIG. 1, housing 14 is rotatably mounted to housing support 12 by means of a shaft 46 that extends along the axis 16. Shaft 46 may be rotatably supported on the housing support 12 such as by means of bearings or by being journalled therein, permitting housing 14 to rotate about axis 16. Shaft 46 may be hollow, as shown, or may alternatively be solid. Alternatively, housing 14 may be rotatable about axis 16 in any other suitable way. For example, shaft 46 may be fixed to housing support 12, and housing 14 may include a pair of bearings that rotatably connect housing 14 to shaft 46.

Referring to FIG. 2, housing 14 may be rotated to a plurality of positions (feeding positions), wherein one of the sides 18 is an upper side 48. A mold cavity enclosure 20, when it is positioned to be on the upper side 48, may be accessed from above by opening the associated lid 22, and the mold cavity 40 may be fed with molding material from above.

Figure 7:
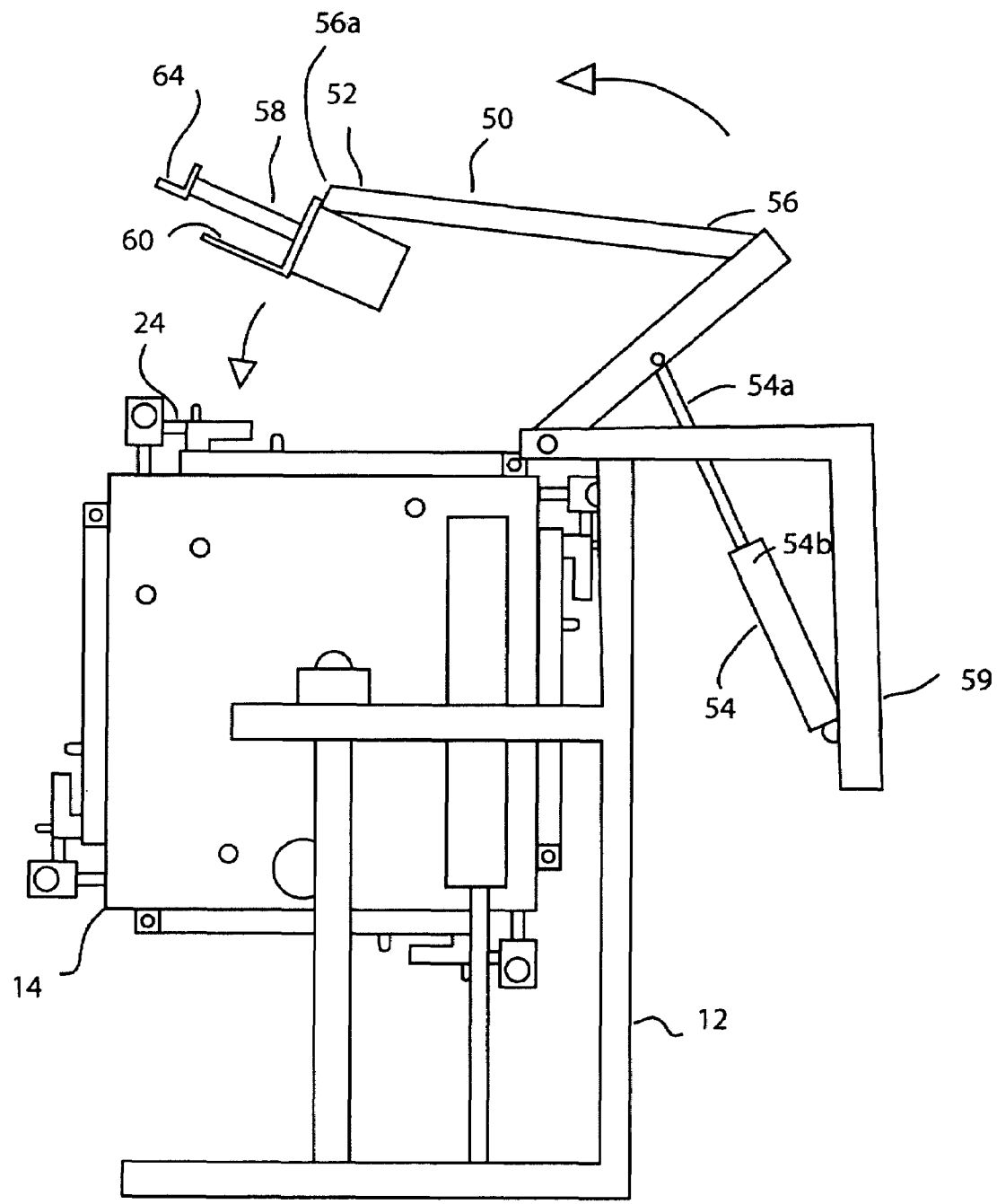
FIG. 7 is a side view of the lid opener and molding station shown in FIG. 1 with the lid in the open position.

As shown in the embodiment of FIG. 7, molding station 10 may optionally include a lid opener 50 for opening and closing a lid 22. Preferably, lid 22 is opened when it is part of upper side 48 so that mold cavity 40 may be filled from above. It will be appreciated that, if mold cavity 40 is filled by injection, lid 22 may be opened when mold cavity enclosure 20 is in any orientation provided that the molded article has cured sufficiently for the mold to be opened. Further, in such an embodiment, lid 22 may be closed when mold cavity enclosure 20 is in any orientation. Further, in such a case, a lid in the normal sense of the word may not be required. Instead, mold portions 42 and 44 may define the cold cavity enclosure.

The lid opener 50 may operate in any suitable way, using any suitable means known in the art. For example, the lid opener 50 may include a lid holder assembly 52 and a first cylinder 54. The lid holder assembly 52 may be releasably connectable to lid 22. Alternately, each lid 22 may have a lid opener permanently attached thereto. The lid holder assembly 52 may include a support arm 56, a lock actuator 58 and a tongue 60. The support arm 56 may be pivotally mounted to a fixed base, such as a point on the housing support 12

(e.g. bracket 59), permitting the movement of the lid holder assembly 52 from a "down" position to an "up" position as shown in FIG. 7.

In the embodiment of FIG. 3, the lock actuator 58 and tongue 60 are mounted at free end 56a of the support arm 56. The lock actuator 58 is configured to engage deadbolt 32 and to move deadbolt 32 between the locked and unlocked positions. For example, lock actuator 58 may include a plate 64, which has an aperture 66 for engaging boss 34 and a second cylinder 62 for moving plate 64 longitudinally. The second cylinder 62 may be fixed to end 56a of the support arm 56 by any means known in the art with plate 64 fixed to the moving end of the cylinder 62. In this embodiment, tongue 60 is releasably attachable to lid 22 by means of aperture 68 for engaging a boss 70 on the lid 22. Other means known in the art may be used such as electromagnetics or other male and female engageable members.

Referring to FIG. 7, first cylinder 54 can be pivotally connected at both ends, where one end is connected to a fixed base, such as a point on the housing support 12, and the other end is connected to a point on the lid holder assembly 52, such as a point on the support arm 56. The first cylinder 54 can be used to move the lid holder assembly 52 between the "down" position and the "up" position.

For the purposes of this disclosure, the term "cylinder" refers to any one of a pneumatic cylinder, a hydraulic cylinder or any other suitable linear actuator device (e.g. tooted plates that move longitudinally relative to each other).

Figure 8:
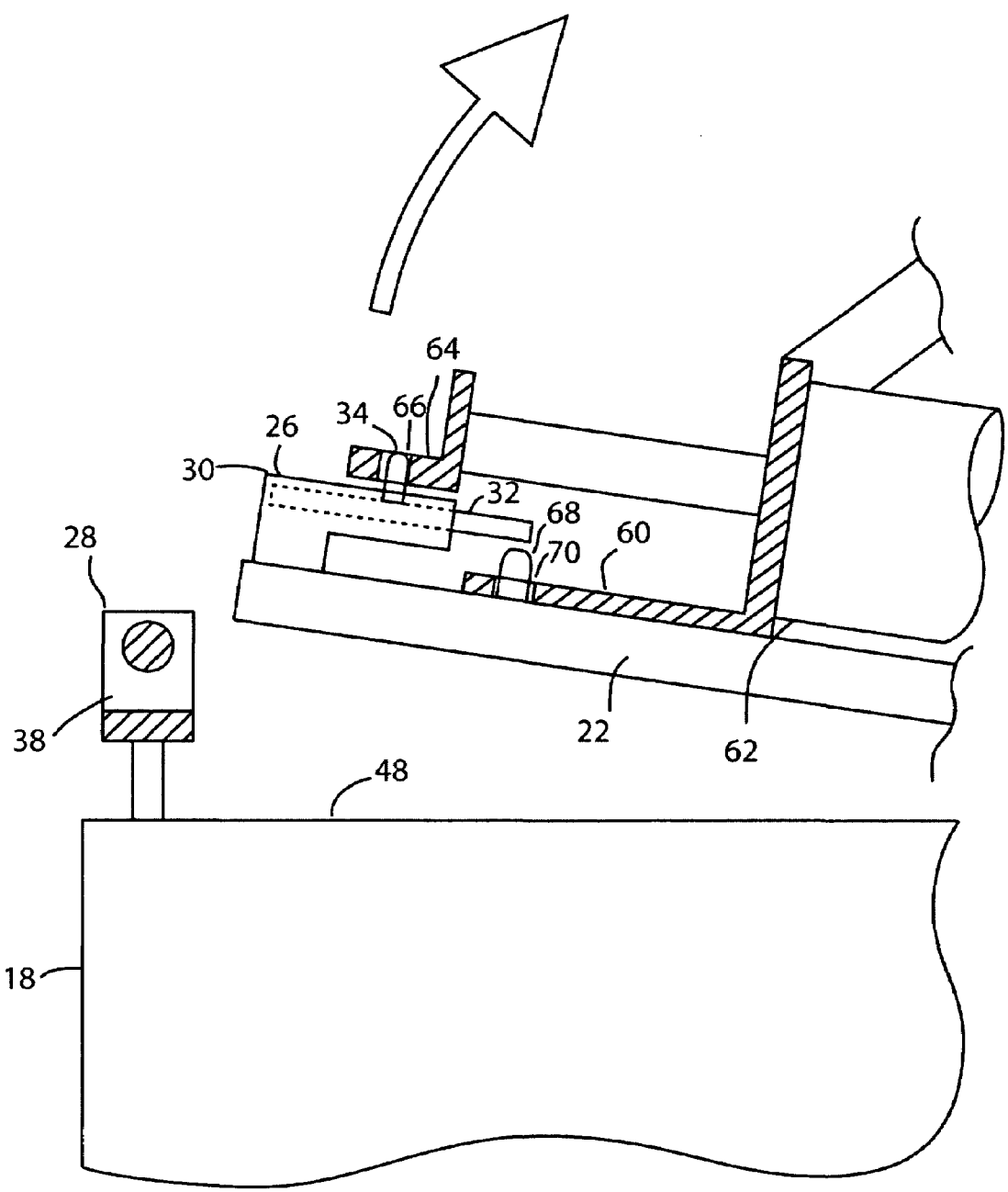
FIG. 8 is a side view of a portion of the lid opener shown in FIG. 7 in the process of moving the lid to the open position.

To open lid 22, the following steps may be taken. For the purpose of this discussion, the lid 22 will be assumed to be in the closed position and the deadbolt 32 may be in the locked position (e.g. as if a molding cycle in the mold cavity with which lid 22 is associated has just been completed and a molded article is to be removed). The first cylinder 54 is extended (i.e. rod 54a is moved out from cylinder 54b) moving the lid holder assembly 52 from the "up" position shown in FIG. 7 to the "down" position. Before reaching the "down" position, the second cylinder 62 is extended outwards so that in the, in the "down" position, aperture 68 engages boss 70 and with the second cylinder 62 extended, aperture 66 engages boss 34 (see FIG. 4). To open lid 22, the second cylinder 62 is retracted to retract plate 64, and in turn move deadbolt 32 from the locked position to the unlocked position (see FIG. 5). The deadbolt 32 in the retracted position extends over tongue 60 preventing tongue 60 from movement away from lid 22. The first cylinder 54 may then be retracted, moving the lid holder assembly 52 from the "down" position to the "up" position. With tongue 60 pinned to lid 22, lid 22 is opened by the retraction of the first cylinder 54 (see FIG. 8).

To close and lock lid 22 when the lid 22 and the lid opener 50 are in the "up" positions, the following steps may be taken. The first cylinder 54 is extended until the lid 22 is closed. The second cylinder 62 is extended, in turn pushing deadbolt 32 into engagement with the deadbolt-receiving piece 28. When the deadbolt 32 is engaged, it no longer pins the tongue 60 to lid 22. The first cylinder 54 can then be retracted, moving the lid holder assembly 52 away from lid 22.

As an alternative to using lid opener 50, the lid 22 on the upper side 48 may be opened and closed manually by an operator, who can then access the associated mold cavity enclosure 20 to remove a molded article therefrom, or to feed the mold cavity with molding material. Further, a lid opener 50 may be used but lock 24 may be manually be manually locked and/or unlocked.

Figure 9:
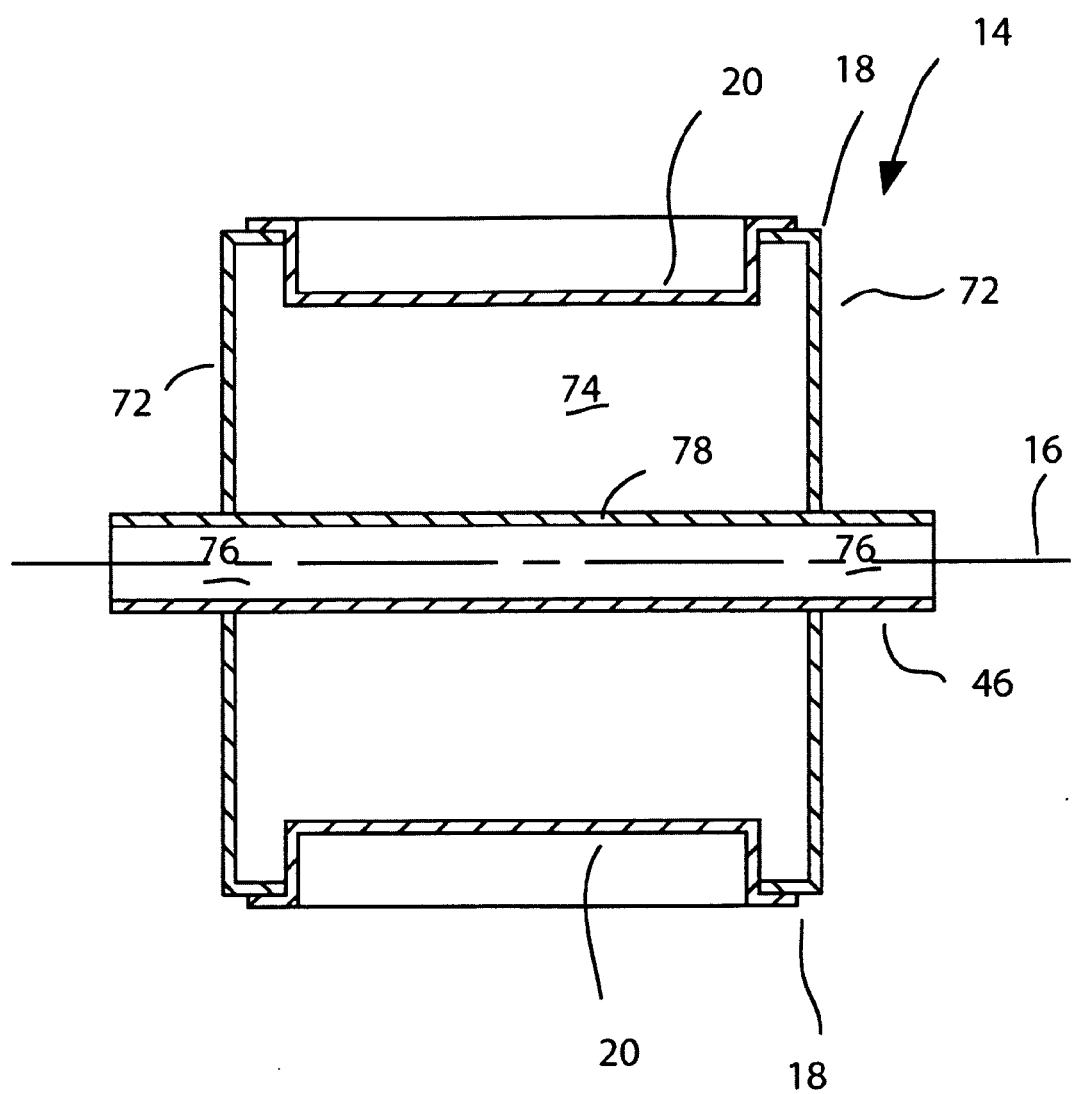
FIG. 9 is a sectional side view of the housing shown in FIG. 1 along the line 9—9 in FIG. 1.

As shown in FIG. 9, a passage 76 may extend through both side faces 72 between the interior volume 74 and the exterior of the housing 14. Passage 76 may extend, for example, from an aperture 78 in a portion of shaft 46 in the interior volume 74 to the outside end of shaft 46. Thus, passage 76 may extend along axis 16. Passage 76 may be used to transport a heat transfer fluid into and out of housing 14 or for the provision of an electrical wire to an electric heater provided within housing 14. Alternately, or in addition, passage 76 may be used to deliver a pressurized gas to mold cavities 40 to assist in the removal of a molded article from a mold cavity.

Figure 10:
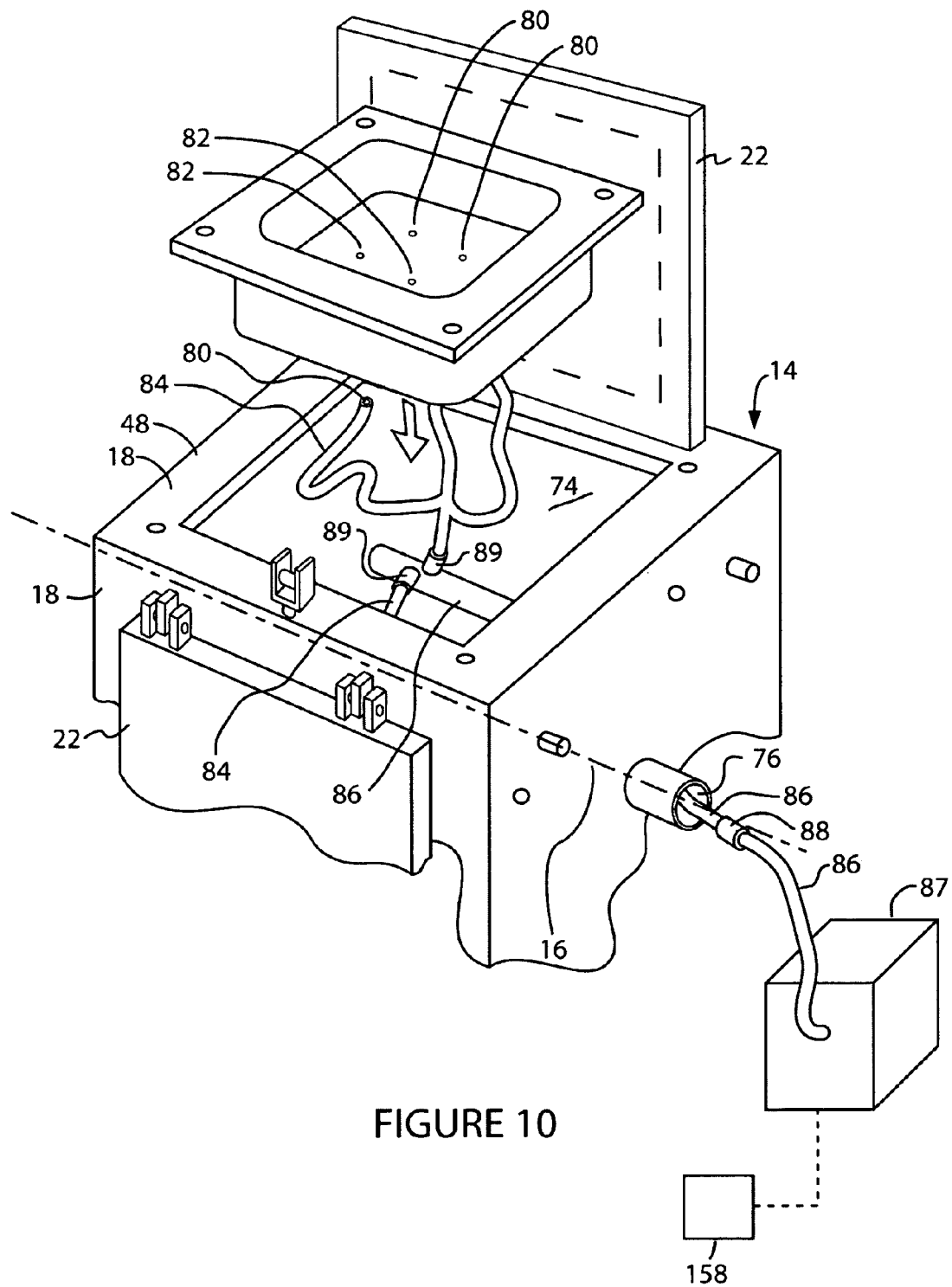
FIG. 10 is a perspective view of a portion of the housing shown in FIG. 1, with an optional pressurized gas injection system.

As shown in the embodiment of FIG. 10, one or more mold cavities 40 of a molding station 10 may include at least one optional pressurized gas outlet 80. The injection of gas between a molded article and the mold portion 42, 44 assists in releasing the molded article from the mold portion 42, 44. Accordingly at least one aperture 82 in communication with a source of pressurized gas may be provided in a mold portion 42, 44. Preferably, at least one aperture 82 is provided in the lower portion of the mold cavity enclosure 20, for example, in the lower mold portion 42 (i.e. at a position below the top of a molded article). At least one aperture may also be provided in upper mold portion 42 to assist in releasing a molded article from upper mold portion 44.

Each aperture 82 is connected to a source of pressurized gas such as via a flexible conduit 84, e.g., as a high-pressure hose. A plurality of flexible conduits 84 may, in turn, be connected to a common conduit 86. Alternately, or in addition, a plurality of apertures may be connected to a conduit 82, 84. The common conduit 86 may pass through passage 76 along axis 16 or through an opening in a wall of housing 14. A rotary coupling 88 may be included in the common conduit 86 to permit a portion of the conduit 86 to rotate with the housing 14, and a portion to remain stationary. Each of conduits 84 and 86 is preferably a flexible hose member.

Via conduits 84 and/or 86, apertures 82 are connected to a selectively activatable source 87 of pressurized gas that may be positioned at the end of conduit 86 distal to apertures 82. Selectively activatable source 87 of pressurized gas may be a gas pump or a high-pressure hose line or a cylinder of compressed gas or the like. One or more valves 89 or the like is provided to isolate the apertures 82 of each mold cavity 40 from the source of high-pressure gas 87. When it is desired to remove a molded article from a mold cavity 40, the apertures 82 of the respective mold cavity are selectively connected to source 87 (e.g. by manually or automatically opening valve 89) so that high-pressure gas is injected below the molded product. Preferably, a singe valve 82 is provided for connecting all of the apertures 82 of a single mold cavity with source 87. However, a plurality of valves may be used for the apertures 82 of each mold cavity 40.

When the housing 14 is positioned so that one of the sides 18 is the upper side 48, and it is desired to remove a molded product from the mold cavity enclosure 20 on the upper side 48, gas may be injected into the mold cavity enclosure 20 through the pressurized gas outlets 80 to loosen the molded product from the enclosure 20.

Molding station 10 may comprise a plurality of mold cavities 40 defined by mold portions 42 and 44 mounted to an open frame (not shown). In such a case, the interior space between lower mold portions 42 may be open to the atmosphere. Alternately, molding station 10 may have two opposing side faces 72, and may define an interior volume 74 between side faces 72 and sides 18 (see, e.g., FIG. 9).

Molding station 10 may include an optional temperature control means, such as a temperature control device 90 that is in thermal communication with some or all of the mold cavity enclosures 20, to control the temperature of the molding material in the mold cavities 40. For example, one or more temperature control devices may be positioned interior of housing 14 to provide a central source for regulating the temperature of mold portions 42, 44. If interior volume 74 is closed or substantially closed, interior volume 74 may define a central volume that has a controlled temperature to provide a source of heat for heating mold portions 42, 44 or for cooling mold portions 42, 44. Alternately a central heat exchanger may be positioned inside interior volume 74. Thus a heat exchanger that is heated or cooled by a fluid may be positioned in interior volume 74. In an alternate embodiment, central heating may be provided by electrical resistance heating. In such a case, lower mold portions are in thermal communication with the interior volume (or the heat exchanger positioned therein) for regulation of the temperature of mold cavities 40. Alternately, the mold cavities 40 may be in thermal communication with at least one temperature control device, and the temperature of mold cavities 40 may be regulated, by providing fluid conduits in at least some of the mold portions 42, 44 such that when the mold portions are installed in molding station 10, the conduits are in communication with a source of heat exchange fluid. It will be appreciated that by having a plurality of molds provided on a single rotatable molding station, only a single heating member may be used and thus only a single temperature controller.

Figure 11:
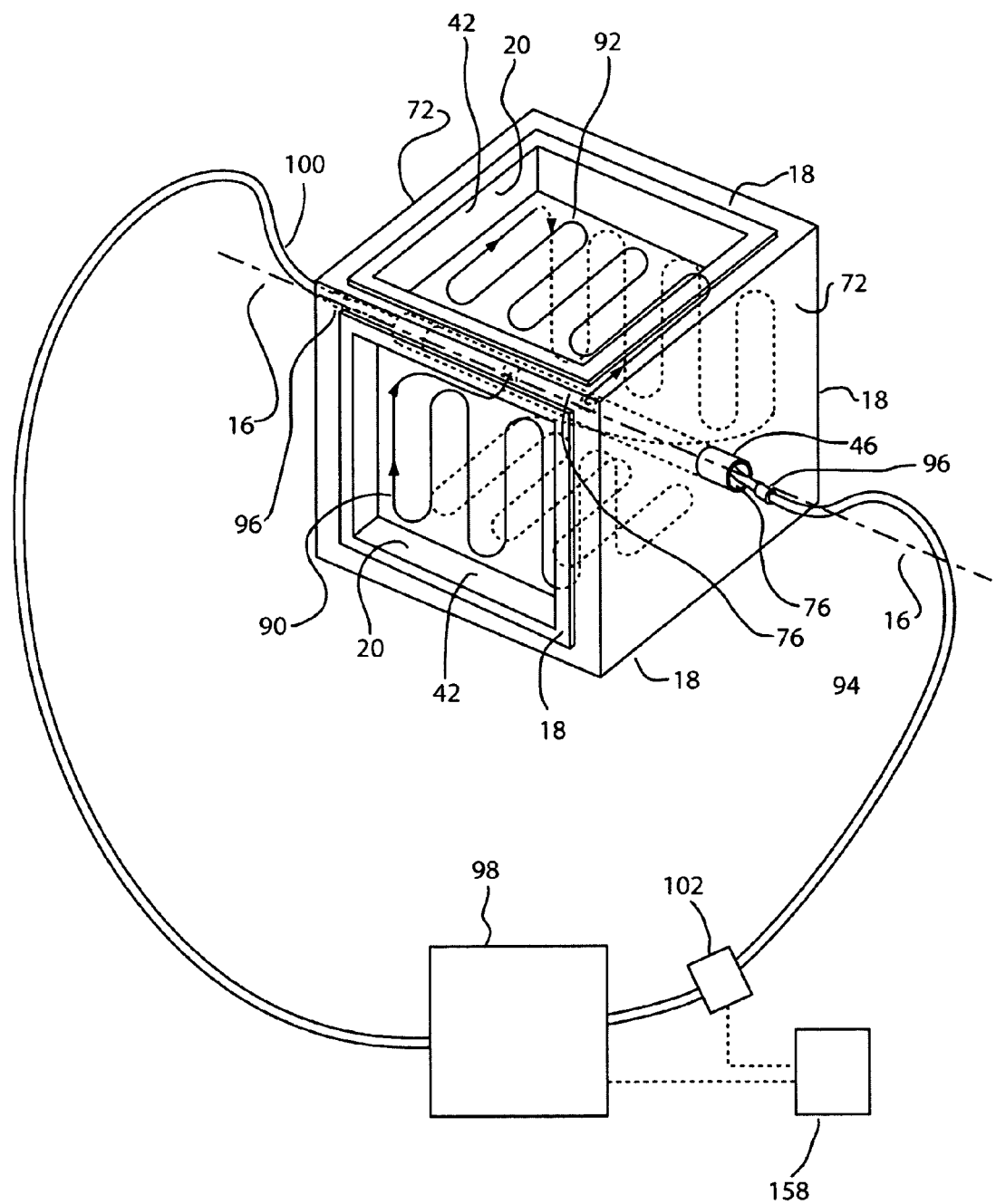
FIG. 11 is a perspective view of the housing shown in FIG. 1, with some portions removed for clarity, with an optional temperature control device.

In the embodiment of FIG. 11, molding station 10 includes optional temperature control device 90 that is in thermal communication with some and preferably all, of the mold cavity enclosures 20, to regulate the temperature of the molding material in the mold cavities 40 as it cures. In this embodiment, the temperature control device 90 includes a fluid conduit 92 that extends throughout the interior volume 74, adjacent to or within the wall of each of the mold cavity enclosures 20. The fluid conduit 92 transports a fluid at a selected temperature so that heat transfer takes place between the fluid and the molding material. The fluid conduit 92 may enter housing 14 through one of the passages 76 and may leave housing 14 through the other of the passages 76, entering and leaving the housing 14 along axis 16. In an alternate embodiment, conduit 92 may regulate the temperature of a central heat exchanger that is in thermal communication with mold cavities 40 via heat conductive connecting members (e.g. copper members).

Fluid conduit 92 may be connected to an exterior fluid conduit 94 on the inlet side, by means of a rotary coupling 96, permitting fluid conduit 92 to rotate with the housing 14, relative to fluid conduit 94. Fluid conduit 94 may be connected to the outlet side of a source 98 of fluid at the selected temperature. Source 98 may include a fluid heating means, a fluid cooling means or both. As an alternative, source 98 may include a connection, for example to a city water line to provide cold water.

Fluid conduit 92 may be connected to a second exterior fluid conduit 100 on the outlet side, by means of a second rotary coupling 96, permitting fluid conduit 92 to rotate with the housing 14, relative to fluid conduit 100. Fluid conduit 100 may be connected to a drain, or, for example, to the inlet side of source 98.

A pump 102 or the like may be used to circulate the fluid through the temperature control device 90. The fluid being transported through the temperature control device 90 may be a liquid or alternatively may be a gas, such as hot air or ambient air. In the case, where the fluid being pumped is a gas, the pump 102 may be a fan or alternatively may be a compressor.

Figure 12:
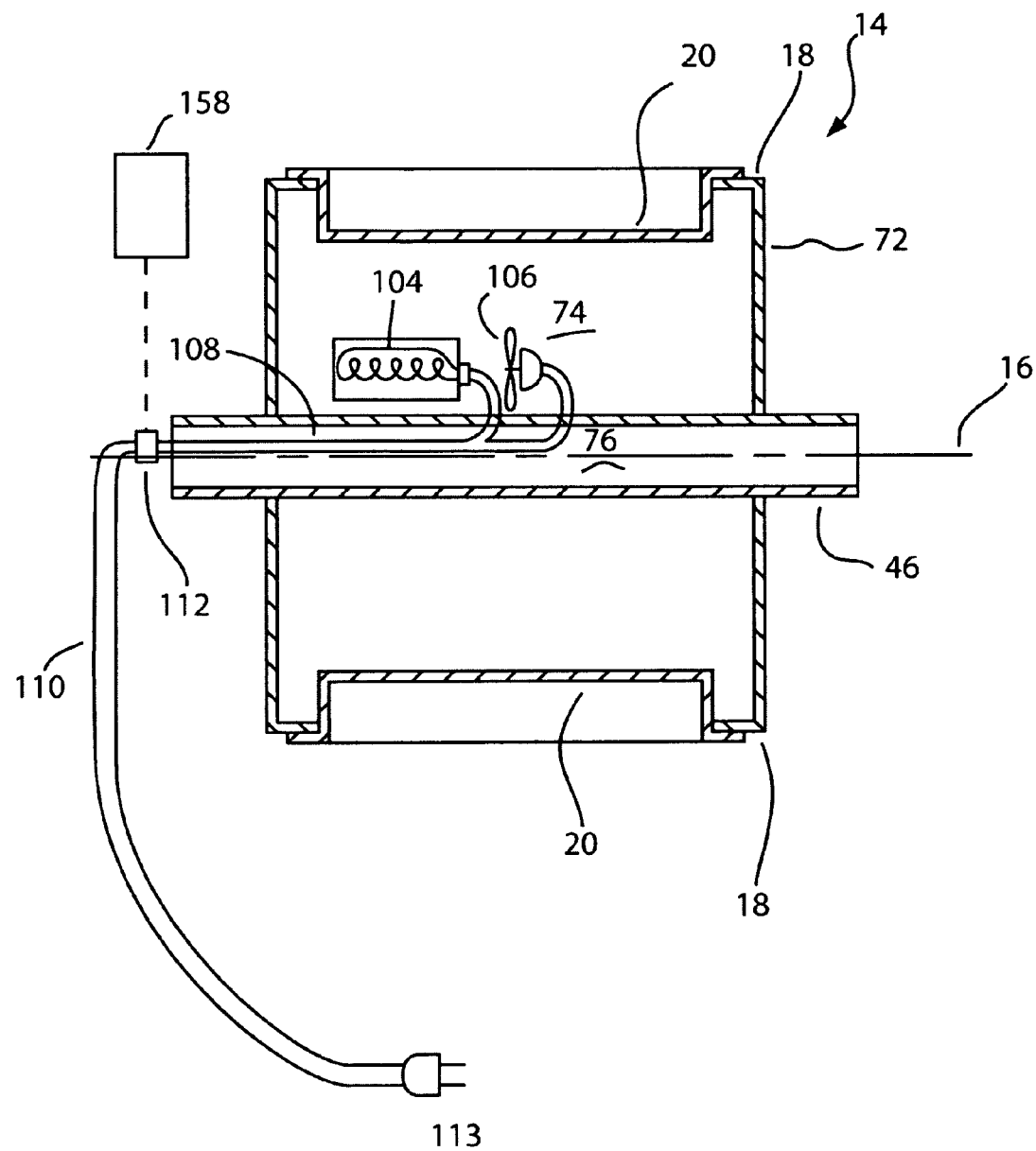
FIG. 12 is a perspective view of the housing shown in FIG. 1, with an alternative optional temperature control device.

Referring to FIG. 12, an alternative temperature control device 90 may include an electrical resistance heater 104. Heater 104 may be positioned in the interior volume 74. A fan 106 may further be included with heater 104 to circulate heated air around the interior volume 74. The fan 106 and heater 104 may have a common electrical conduit 108, which may extend through the passage 76 out of the housing 14. The electrical conduit 108 may be connected to a second electrical conduit 110 by means of a rotary coupling 112. The second electrical conduit 110 may be, in turn, connected to an electrical power source (not shown) via plug 113 or the like. In an alternate embodiment, electrical resistance heaters may be provided adjacent the exterior of mold portions 42 and/or 44 or they may be provided within the walls of mold portions 42 and/or 44.

Figure 13:
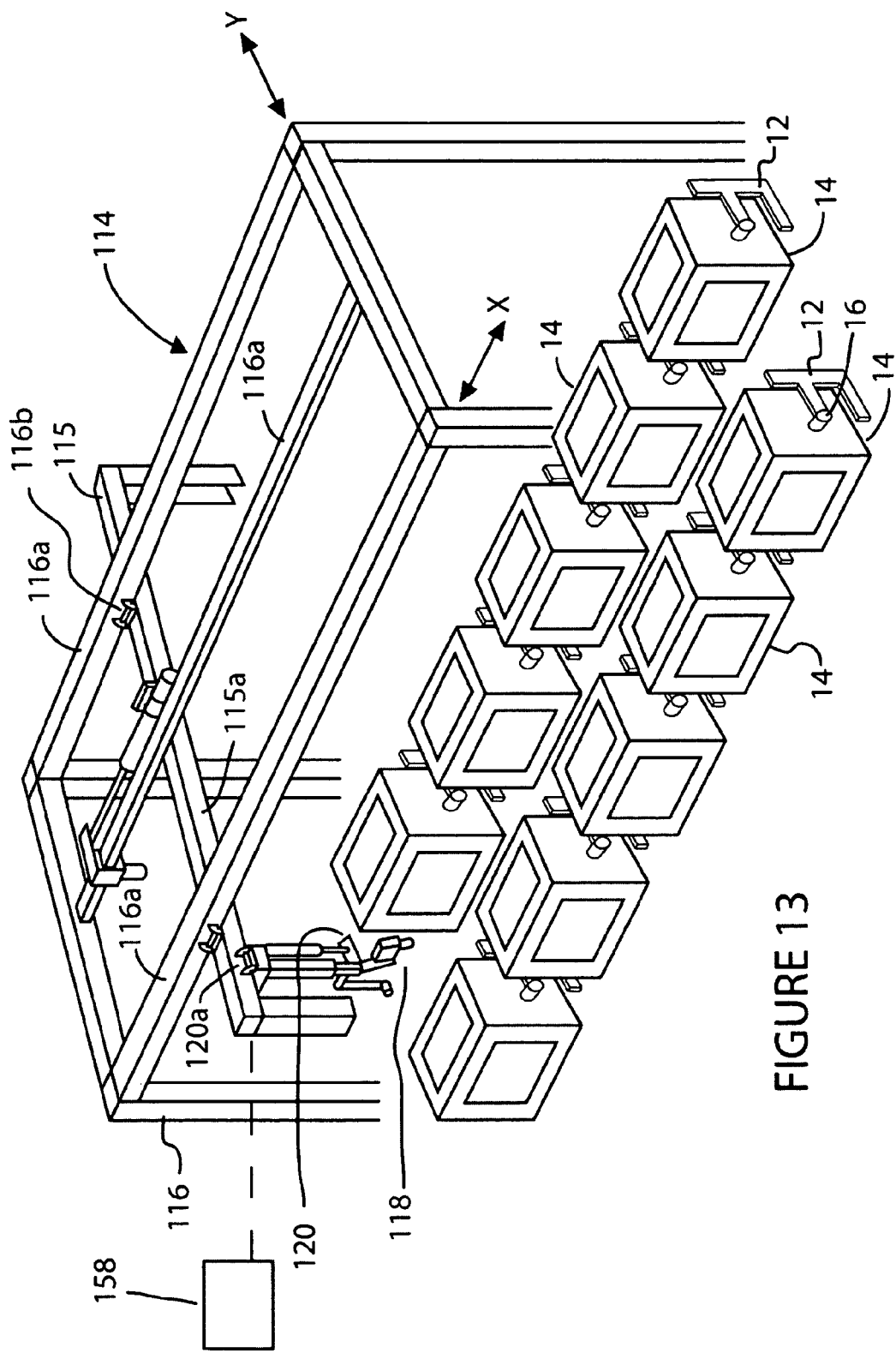
FIG. 13 is a perspective view of a plurality of molding stations, with an optional overhead feeding system.

As shown in the embodiment of FIG. 13, molding station 10 may optionally include an overhead feeding means, such as an overhead feeding system 114. Pursuant to this embodiment, housing 14 is rotatable through a plurality of feeding positions, such that in each feeding position the mold cavity 40 on the upper side 48 can be filled from above by the overhead feeding system 114. Housing 14 may be rotatable through an infinite number of positions in which case a controller is provided to automatically or manually stop the rotation of housing 14 when a side 18 is generally horizontally disposed (i.e. so that a mold cavity 14 may be filled without the feed material spilling over one wall of the mold cavity being filled). Alternately, housing 14 may be rotatable, either manually or automatically, though a series of preset feeding positions in each of which a side 18 is generally horizontally disposed.

The overhead feeding system 114 may be used to feed a plurality of housings 14 arranged in one or more rows each of which is rotatable, and preferably independently rotatable, about a generally horizontal axis 16. In such a case, overhead feeding system 114 is selectively positionable above each housing 14 so that overhead feeding system 114 may be used to fill a mold cavity 40 of a housing 14 when positioned above the housing 14. To this end overhead feeding system 114 may be movable mounted, such as along a ceiling or a wall, so that it may be used to fill mold cavities 40 of different housings 14. While overhead feeding system 114 may incorporate a flexible hose so that overhead feeding system 114 does not have to be moveably mounted directly above a row of housings 14, it is preferred to mount overhead feeding system 114 on a track system that is generally above and generally extends along a line with housings 14.

The overhead feeding system 114 may include an overhead crane 116 and a feeding assembly 118 mounted on a mobile platform 115. Mobile platform travels along tracks 116a by means of wheels 116b. The overhead crane 116 and mobile platform 115 may be a standard crane assembly that can be purchased as a complete unit. Crane 116 is configured so that feeding assembly 118 is positionable above each of the housings 14 for feeding a mold cavity enclosure 20. To this end, crane 116 may be constructed so that tracks 116a are generally above housings 14. Alternately, a track that extends in a loop above housings 14 may be used with feeding assembly 118 movably mounted to the track. Alternately, feeding assembly 118 may be mounted at a single fixed location and have a flexible hose so that feeding assembly may be positioned above each housing 14.

Feeding assembly 118 may be mounted to a movable head 120. Head 120 with feeding assembly 118 attached thereto is moveable in at least one direction, and may optionally be moveable in two directions, depending on the configuration of the molding stations 10 to be fed. For example, as shown in FIG. 13, housings 14 are positioned in two rows, each of which is parallel to axis 16. In this configuration, feeding assembly 118 is preferably moveable at least in the direction represented by arrows X (i.e. generally parallel to axes 16). To service both rows, feeding assembly 118 may include a flexible hose so that assembly 118 is positionable over the housings 14 of each row. Alternately, or in addition, feeding assembly 118 may be moveable also in the direction represented by arrows Y (i.e. generally transverse to axes 16) such as by configuring mobile platform 115 to include a track 115a and providing head 120 with wheels 120a for movement of head 120 along track 115a. It will be appreciated that other constructions of a support for feeding assembly 118 may be utilized if housings 14 are laid out in a different pattern, e.g. a triangular pattern. Furthermore, crane 116 may optionally provide vertical movement of the head 120 and feeding assembly 118 downwardly towards and upwardly away from housings 14.

Figure 14:
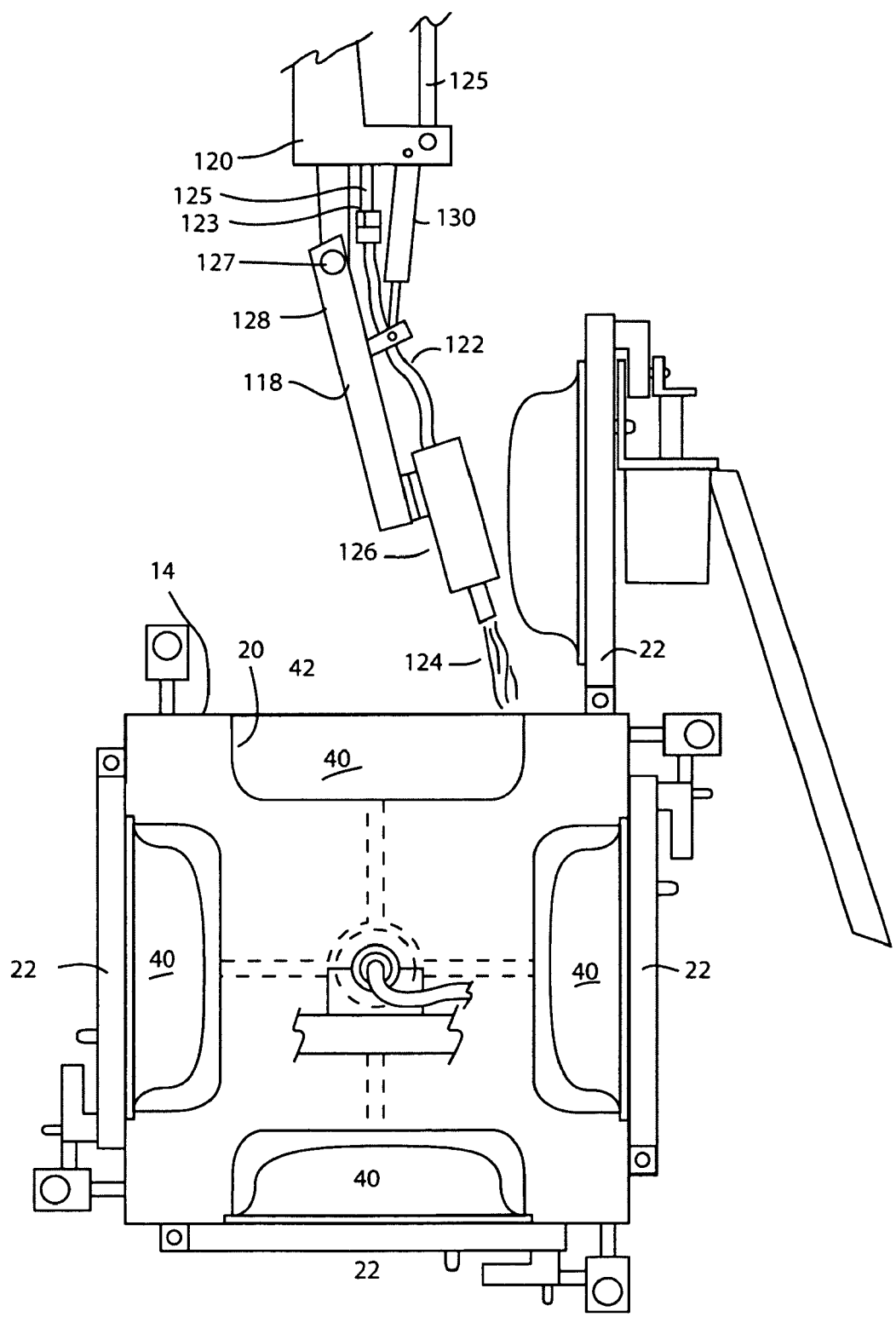
FIG. 14 is a side view of the molding station and a portion of the overhead feeding system shown in FIG. 13.

As shown in the embodiment of to FIG. 14, the feeding assembly 118 includes a molding material transport conduit 122 that has an inlet 123 and an outlet 124. Conduit 122 is for receiving molding material from one or more sources of molding material (not shown) through inlet 123 which is in flow communication with conduit 125 and for discharging the molding material out through outlet 124 into a mold cavity 40. Conduit 122 may be a flexible conduit, such as, for example, a suitable hose. The flow of molding material through conduit 122 may be controlled by a valve 126, which is preferably positioned in conduit 122 adjacent outlet 124 so that outlet 124 is selectively connectable with a source of molding material. Feed conduit 125 preferably extends along crane 116.

Valve 126 and, optionally, molding material transport conduit 122, may be mounted on a support arm 128, which may, in turn, be pivotally mounted to the head 120 via pivot 127. A cylinder 130 may be mounted at one end to the head 120 and at the other end to the support arm 128. Cylinder 130 can be alternately retracted and extended so that support arm 128 pivots about pivot 127 thereby moving outlet 124 moves back and forth over a mold cavity 40. The back-and-forth motion of outlet 124 facilitates an even feeding of molding material into mold cavity 40. It will be appreciated that the feeding assembly 118 may operate without having the pivoted mounting of support arm 128 and without including cylinder 130. Further this construction may be used to selectively position feeding assembly 118 alternately above a housing 14 in one row of housings and then above a housing in another row of housings.

Housing 14 may be manually rotated by an operator or by mechanical means such as a programmable stepper motor, a gear driven pulley system, a servo-motor, and an associated gearbox or the like.

Figure 15:
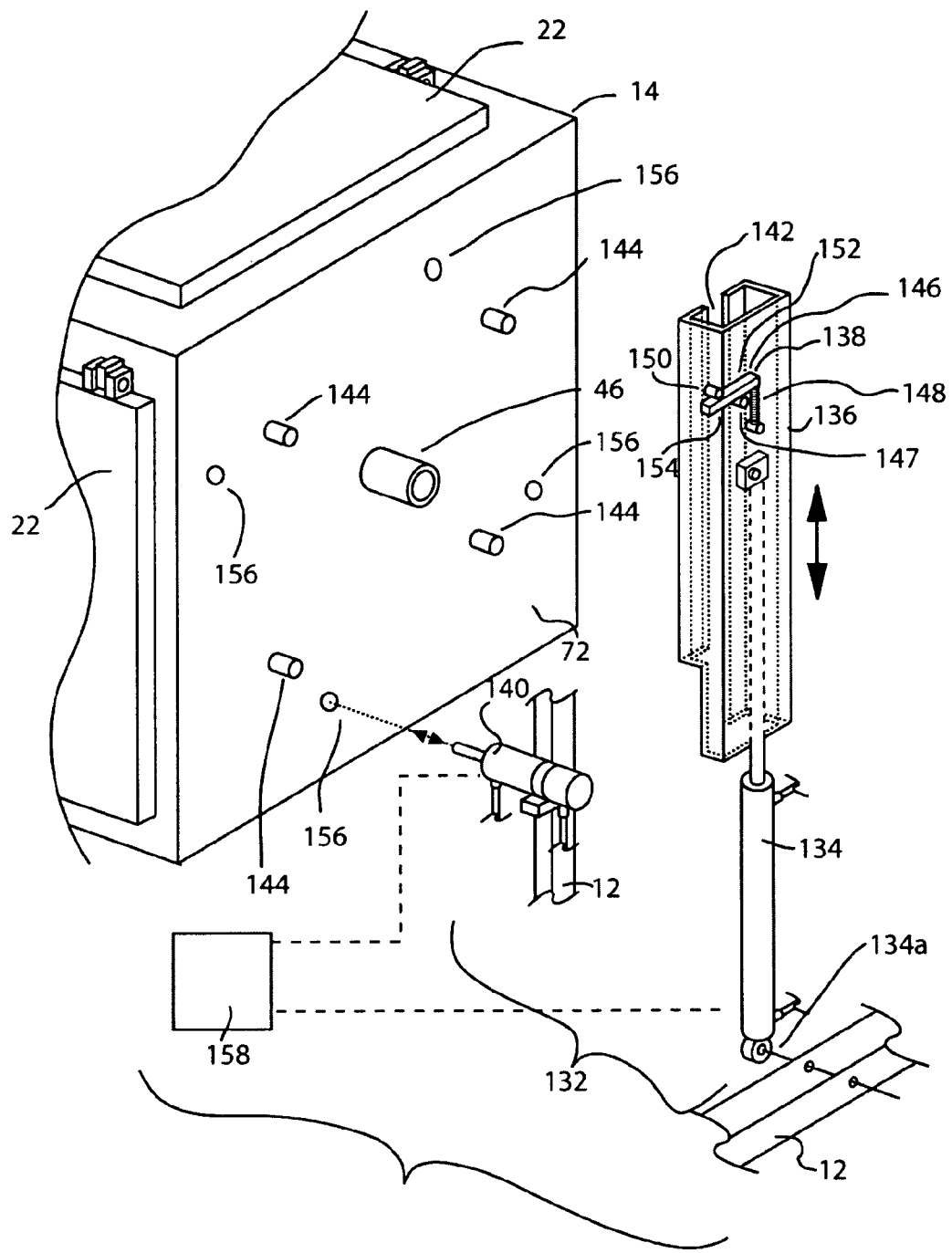
FIG. 15 is a perspective view of a portion of a rotatable drive system for the molding station shown in FIG. 1.

The drive system may be any suitable drive means for rotating a housing 14 between sequential feeding positions wherein each of sides 18 is sequentially the upper side 48 and is positioned for having a molded product removed from the corresponding mold cavity 40, and having that mold cavity 40 filled with fresh molding material. A drive system that utilizes a cylinder is exemplified in the embodiment of FIG. 15. However other drive systems known in the art, such as systems using stepping motors, belt drive systems and the like may be used. In the embodiment of FIG. 15, drive 132 includes a first drive cylinder 134, engagement means for drivingly engaging housing 14 and optionally a second locking cylinder 140. The engagement means my use physical interaction of mechanical members, electromagnetics or other systems known in the mechanical art.

In the assembly of FIG. 15, the engagement means uses a guide piece 136 and a pin latch assembly 138. The drive cylinder 134 may be pivotally mounted at one end to a base, such as the housing support 12, by means of pivot 134a. The other end of the drive cylinder 134 may be fixedly mounted to the guide piece 136. The guide piece 136 has an engagement member for engaging a mating engagement member on housing 14. For example, the engagement member of guide piece 136 may be a slot 142 and the engagement member on housing 14 may be a plurality of pins 144 extending outwardly from one of the side faces 72. Pin latch assembly 138 is used to latch onto a pin 144 in slot 142 to drivingly connect cylinder 134 to housing 14. Pin latch assembly 138 may include an elongate latch piece 146, a spring 148 and a stop 150. Latch piece 146 is rotatably mounted by means of pivot 147 about an intermediate point along its length to guide piece 136. Latch piece 146 is positioned to extend across slot 142, to secure pin 144 in slot 142 one pin 144 travels downwardly into slot 142 past stop 150. Latch piece 146 has an upper surface 152 and a lower surface 154. Spring 148 is affixed to drive 132 to bias latch piece 146 against stop 150 such as by being affixed at one end to a portion of latch piece 146 and at the other end to a point on guide piece 136. Stop 150 is positioned on guide piece 136 to limit the upper rotational travel of latch piece 146.

The locking cylinder 140 may be fixed at one end to a base, such as the housing support 12. The cylinder 140 may be movable between an extended position, wherein the cylinder 140 engages an aperture 156 in one of the side faces 72, to lock housing 14 in place in a feeding position, and a retracted position, wherein the cylinder is removed from aperture 156 allowing drive 132 to rotate housing 14.

Figure 16:
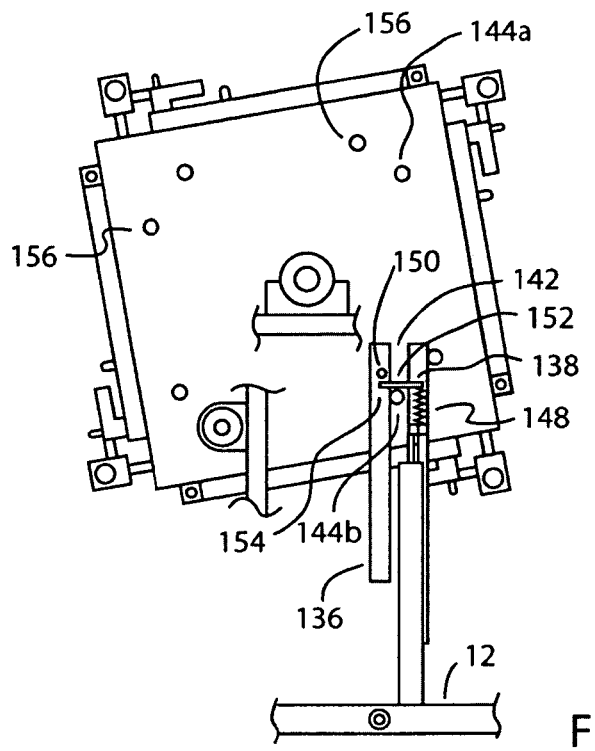
FIGS. 16, 17, 18 and 19 are side views illustrating the operation of the rotatable drive system shown in FIG. 15, with some portions removed for clarity.
Figure 17:
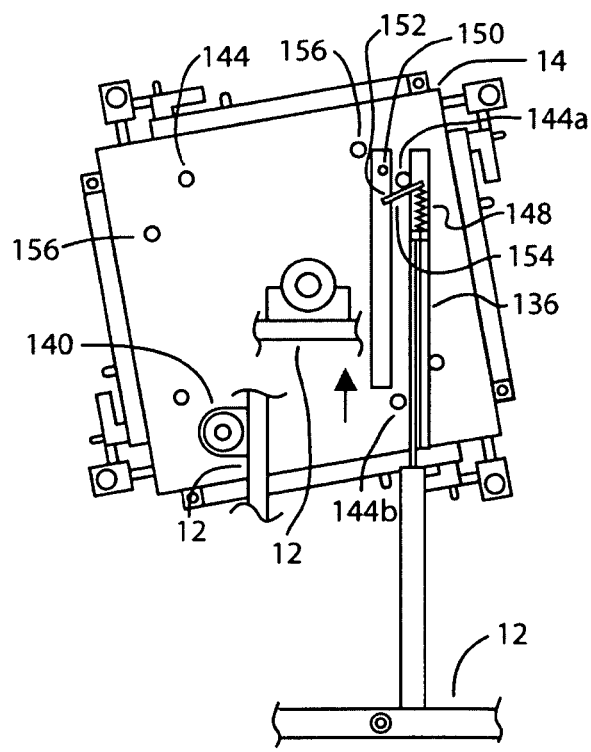
Figure 18:
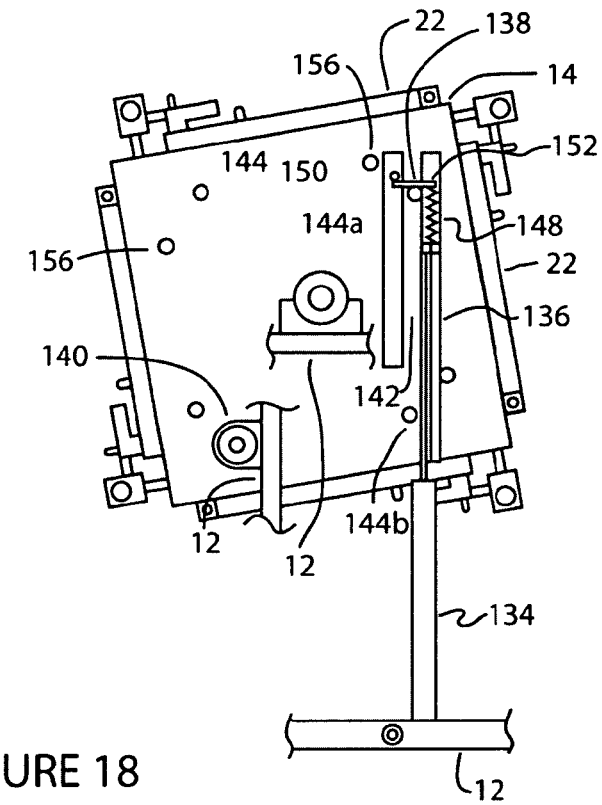

The operation of drive 132 is exemplified in FIGS. 16, 17, 18 and 19. In each of these Figures, only the portion of the guide piece 136 that defines slot 142 is shown for clarity. The operation of drive 132 is as follows. The locking cylinder 140 retracts to permit the rotation of housing 14. Referring to FIG. 16, the drive cylinder 134 extends upwards thereby driving guide piece and slot 142 upwardly towards pin 144a. Eventually, pin 144a enters slot 142 (see FIG. 17). As cylinder 134 continues to extend, pin 144b exits the bottom of slot 142, and latch piece 146 contacts pin 144a with its upper surface 152. As cylinder 134 continues to extend further upwardly, latch piece 146 rotates down out of the way of pin 144a. Once pin 144a passes into slot 142 past latch piece 146, spring 148 biases latch piece 146 against stop 150 (see FIG. 18). Up to this point, housing 14 has not commenced rotation.

Figure 19:
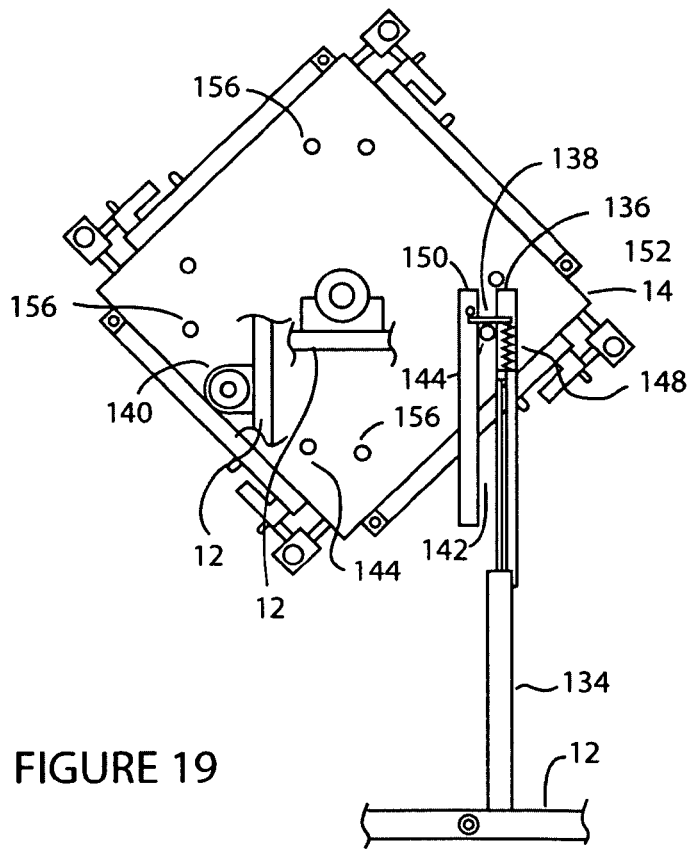

Once pin 144a is positioned below latch piece 146, drive cylinder 134 can be retracted, to cause the lower surface 154 of latch piece 146 to engage pin 144a (see FIG. 19). Stop 150 prevents latch piece 146 from rotating, and thus, housing 14 is now drivingly connected to cylinder 134. As cylinder 134 retracts further, housing 14 rotates, driven by the engagement between latch piece 146, slot 142 and pin 144. As cylinder 134 retracts, the rotation of housing 14 is sufficient so that pin 144b is not re-engaged by slot 142, and so that pin 144b clears guide piece 136 completely. Once a new feeding position is reached, the retraction of cylinder 134 stops. The feeding positions may be preset by the lower limit of retraction of cylinder 134. At this point a new aperture 156 may be aligned with locking cylinder 140. Locking cylinder 140 may then be extended into the new aperture 156 to lock housing 14 in place in the new feeding position. Alternately, cylinder 134 may be used to hold housing 14 in the feeding position.

The molding system 10 may also include a control system 158. Control system 158 may control one or more of the operations of the drive 132, the overhead feeding system 114 (the positioning of feeding assembly 118 and/or the operation of valve 126), the temperature control device 90, and the gas injection into the mold cavity from the source 87 of pressurized gas.

One of the functions of the control system 158 that relates to the overhead feeding system 114 is that the control system 158 requires feedback from crane 116 to identify the actual location of head 120 and feeding assembly 118. The feedback may be in the form of a sensor that counts revolutions on any drive motors that may be used to drive the various movements of the crane 116.

The operation of the control system 158 for the molding station 10 will now be described. In one embodiment, the molding station 10 is driven by the drive 132 to a feeding position for feeding a mold cavity enclosure 20 with molding material. If provided, lid opener 50 is used to open the lid 22 that is on the upper side 48 activated (either manually by an operator or automatically by control system 158 once control system 158 receives an input confirming that housing 14 is in a feeding position). If there is a molded article in the mold cavity 40, pressurized gas may be injected into the mold cavity from the one or more pressurized gas outlets 80, to loosen the molded article from the lower mold 42 portion of the enclosure 20 activated (either manually by an operator or automatically by control system 158 once control system 158 receives an input confirming that lid 22 is in the open position). The molded article may be removed from the lower mold portion 42. If provided, overhead feeding system 114 may be activated (either manually by an operator or automatically by control system 158 once control system 158 receives inputs confirming that overhead feeding system 114 is in position and lid 22 is open) so that a selected amount of molding material may be fed into the lower mold portion 42 one it is positioned to feed the selected mold cavity enclosure 20. The lid opener 50 may then be activated (either manually by an operator or automatically by control system 158 once control system 158 receives an input confirming that a pre-selected amount of feed material has been fed to the selected mold cavity enclosure) to close the lid 22.

If provided, temperature control device 90 may be activated at any time to control the temperature of the molding material and of the mold cavity enclosure 20. Preferably, temperature control device is operated at all times during operation of the molding assembly. The molding material may rise and may set or cure to some degree before rotation of the housing 14 begins, so that it continues to maintain its shape when the mold is partially or fully inverted. Once the molding material has set sufficiently, the drive 132 may be used to rotate housing 14 to a new feeding position. The rotation of housing 14 helps to provide uniform material properties in the final molded article. The movement of the article through 360 degrees of rotation distributes the molding material evenly as it cures and as the internal cell structure within the molded article forms in the event that the molded article has an internal cell structure.

Once the feeding of molding material has stopped, the assembly is reconfigured so that the next selected molding cavity enclosure 20 may be filled. This requires that a mold cavity enclosure be positioned as being in the upper surface 48 of a housing 14 and that the feeding assembly 118 is positioned to feed the next selected molding cavity enclosure 20. These steps may occur sequentially or simultaneously. Further, the next selected molding cavity enclosure 20 may be prepared for feeding while the previous mold cavity enclosure 20 is still being fed.

For example, the feeding assembly 118 may be moved to be above an adjacent housing 14 for feeding molding material into a lower mold portion 42 on the upper side 48 of that adjacent housing 14. It will be noted that the adjacent housing 14 need not rotate in a synchronous relationship with the first housing 14. Each housing 14 may rotate independently, e.g. by being controlled by the control system 158. Each housing 14 may have different sized mold cavity enclosures 20 and may produce articles of different sizes and having different curing times. In one embodiment, it will be appreciated that the next selected mold cavity enclosure is on the same housing 14 as the one that has just been filed. Further, the next selected mold cavity enclosure need not be the next mold cavity enclosure 20 that is sequentially positioned about axis 16 of housing 14.

Preferably, next selected mold cavity enclosure is provided on a different housing 14 and, more preferably, overhead feeding system 114 travels sequentially past along a line of housings 14. In accordance with this preferred mode of operation, once the next selected housing 14 is in the new feeding position, the lid 22 of the selected mold cavity enclosure 20 is opened and the overhead feeding system 114 is positioned for feeding material into the lower mold portion 42 of the new mold cavity enclosure 20. The overhead feeding system 114 may move the feeding assembly 118 around the array of housings 14, for feeding molding material into a first enclosure 20 in each subsequent housing 14, before returning to feed molding material into the new, second enclosure 20 in the first housing 14.

The process as described above is preferably repeated for each side 18 of each housing as each side 18 is rotated to be the upper side 48. The molding material in the first mold cavity enclosure 20 on the first or initial side 18 may continue to cure as that side 18 rotates around and eventually becomes the upper side 48 again at which time the cured article is removed.

To provide improved production efficiency for molding station 10, the number of sides 18 of a housing 14 is maintained in a ratio that corresponds roughly to the ratio of the time a single side 18 spends as the upper surface 48 during a single rotation cycle (i.e. the time to rotate side 18 into and out or the position at which it is the upper surface 48, the time to remove an article from an enclosure 20 and to the time refill the enclosure) to the time of a single rotation cycle (i.e. the curing time as a mold cavity enclosure rotates through 360 degrees, the time to remove an article from an enclosure 20 and to the time refill the enclosure). For example, each side 18 may spend 2 minutes as the upper surface 48 during a single rotation cycle that lasts 8 minutes. In this case, the preferred number of sides is 4. Thus the molded article may be fully cured shortly before the housing 14 rotates into position for that molded article to be removed from enclosure 20, rather than being fully cured long before housing 14 rotates into position for its removal. The relationship between the curing time and the removal/feeding time may be controlled by several factors, including the feed rate of the molding material into the enclosures 20, the temperature of the temperature control device 90 and the actuation speed of the plurality of cylinders used as part of molding station 10. An advantage of the process is that a single operator may operate a plurality of housings (e.g. 4 or 5) each of which may have 3 or 4 mold cavities without walking far. According a single operator may fill and empty, e.g., 12–20 mold cavities.

Figure 20:
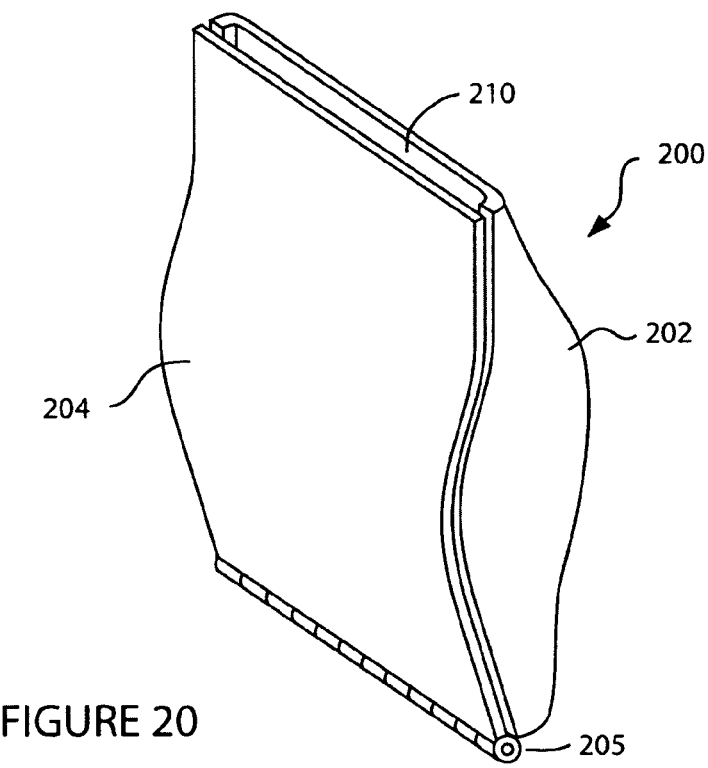
FIG. 20 is a perspective view of a mold cavity enclosure for an open foam molded article, for use with a molding station in accordance with an alternative embodiment of the present invention.
Figure 21:
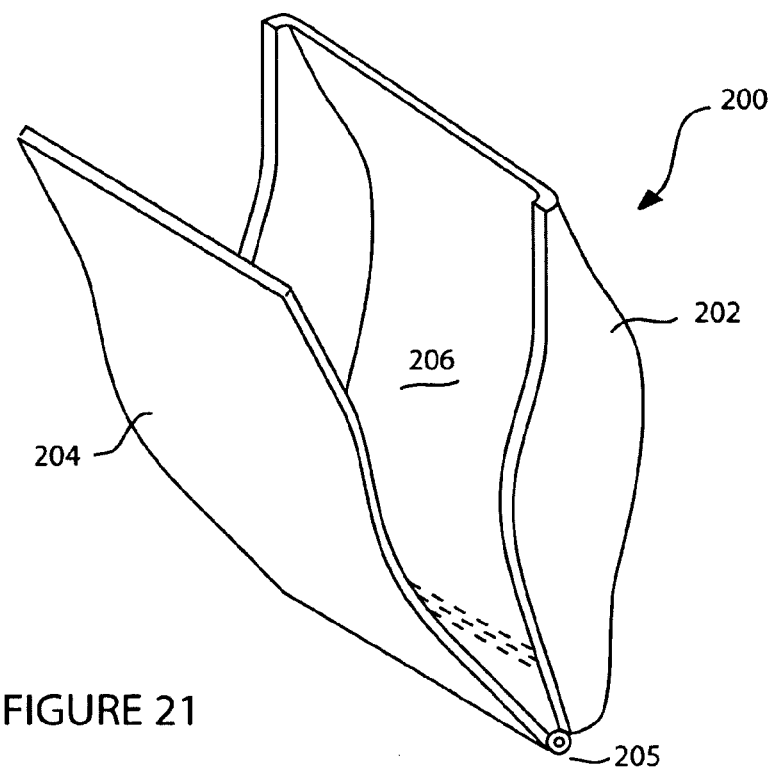
FIG. 21 is a perspective view of the mold cavity enclosure shown in FIG. 20 in the open position.
Figure 22:
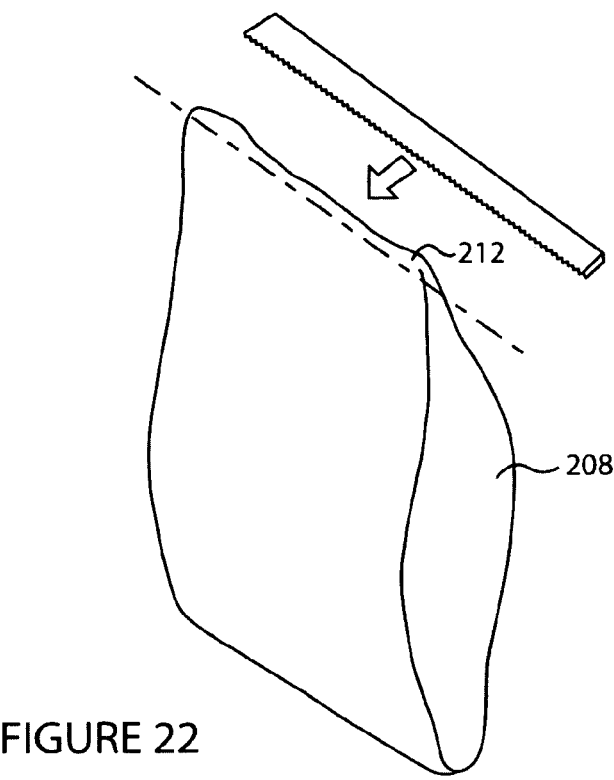
FIG. 22 is a perspective view of a molded article produced by the mold cavity enclosure in FIG. 23, with a portion of the molded article to be removed.

In accordance with another embodiment of this invention, the method and apparatus may be modified for use with open foam molding process. Referring to FIG. 20, a mold cavity enclosure 200 which can be used for an open foam molding process is shown. Enclosure 200 includes a first mold portion 202 and a second mold portion 204. The first and second mold portions 202 and 204 are movably connected to each other between an open position in which the molded article may be removed (see, e.g., FIG. 21) and a closed position in which they define an open foam mold cavity 206 (see, e.g., FIG. 20). In the open position the first and second mold portions 202 and 204 are adapted to release a molded article from the enclosure 200, such as the molded article 208 shown in FIG. 22. First and second mold portions 202 and 204 may be separate members of they may be connected together, such as by pivot 205.

In an open foam process, the mold cavity 206 is open to the atmosphere so that the molding material can expand without being confined to a closed volume. Thus mold cavity enclosure 200 has an opening 210 at the top. Opening 210 may be sized to permit the uninhibited expansion of the molding material, while keeping a suitably small portion 212 of the molded article 210 dimensionally uncontrolled.

Figure 23:
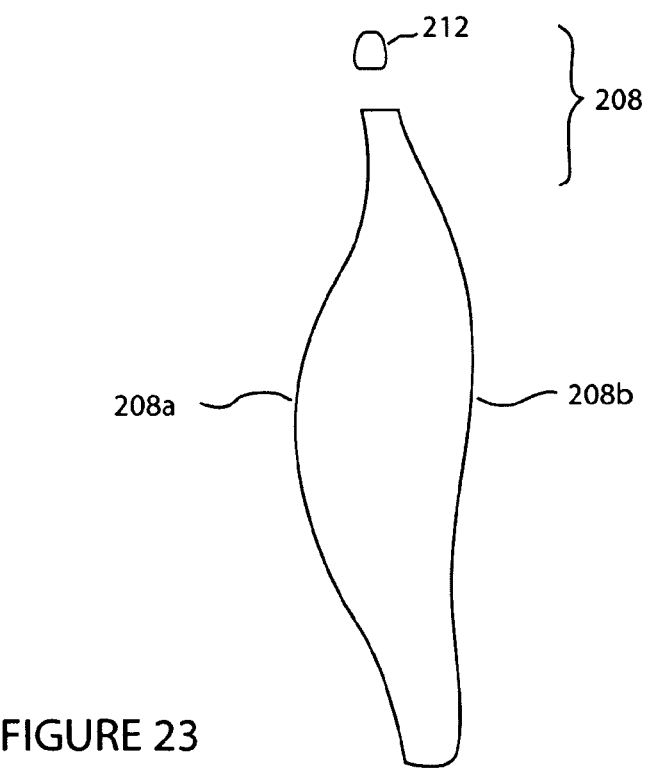
FIG. 23 is a side view of the molded article shown in FIG. 25, shown with a portion removed.

The dimensionally uncontrolled portion 212 may then be cut or otherwise removed from the molded article 208 (see FIG. 23) by any means known in the art. By molding the molded article 208 in an individual enclosure 200, the molded article is permitted greater flexibility for overall shape, relative to an article made from a typical open foam process on a conveyor belt. Furthermore, less waste may be produced in the form of the dimensionally uncontrolled portion, since the size of opening 210 may be selected as desired. Preferably, mold cavity 200 surrounds at least about 90% of molded article 208. Such partially open mold enclosures are particularly useful for molding products such as foam padding for chair seats and chair backs wherein at least one surface of the molded product, and sometimes two surfaces, are dimensionally controlled so that the cured molded product has a pre-selected shape. Referring to FIG. 23, front side 208a, and preferably also backside 208b, are shaped to provide a chair with the desired configuration of the seat or the chair back (or back rest) of a chair.

Figure 24:
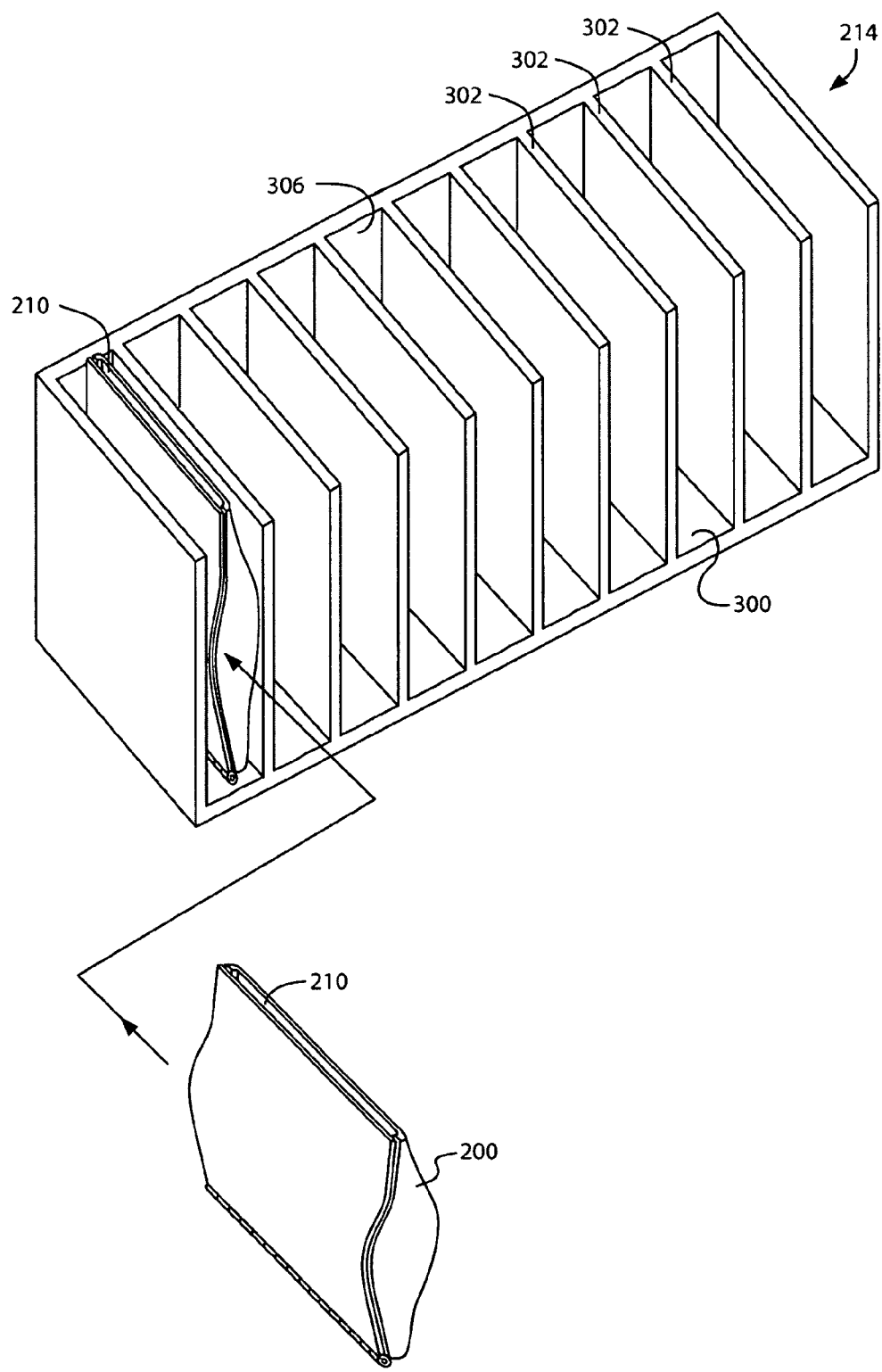
FIG. 24 is a perspective view of a cassette for receiving several of the mold cavity enclosures shown in FIG. 20.

In the embodiment of FIG. 24, a cassette 214 in accordance with another embodiment of the present invention is shown. Cassette 214 is adapted for releasably holding a plurality of mold cavity enclosures 200. For example, cassette 214 may include a support shelf 300 and a plurality of upstanding dividers 302 extending upwardly from the support shelf 300. Dividers 302 may be generally parallel to one another. Each pair of adjacent dividers 302 defines a slot 304. Each slot 304 is adapted to hold one mold cavity enclosure 200 in an upright position, i.e. with the opening 210 facing upwards. Optionally, a back 306 may be included in cassette 214. Back 306 facilitates the placement of all of the mold cavity enclosures 200 in the same relative position in the slots 304. Dividers 302 may have walls that extend outwardly to narrow the upper portion of slot 304. Alternately, or in addition, engagement members may be provided on mold cavity enclosures 200 and the walls of slots 304 to secure mold cavity enclosures 200 therein.

Figure 25:
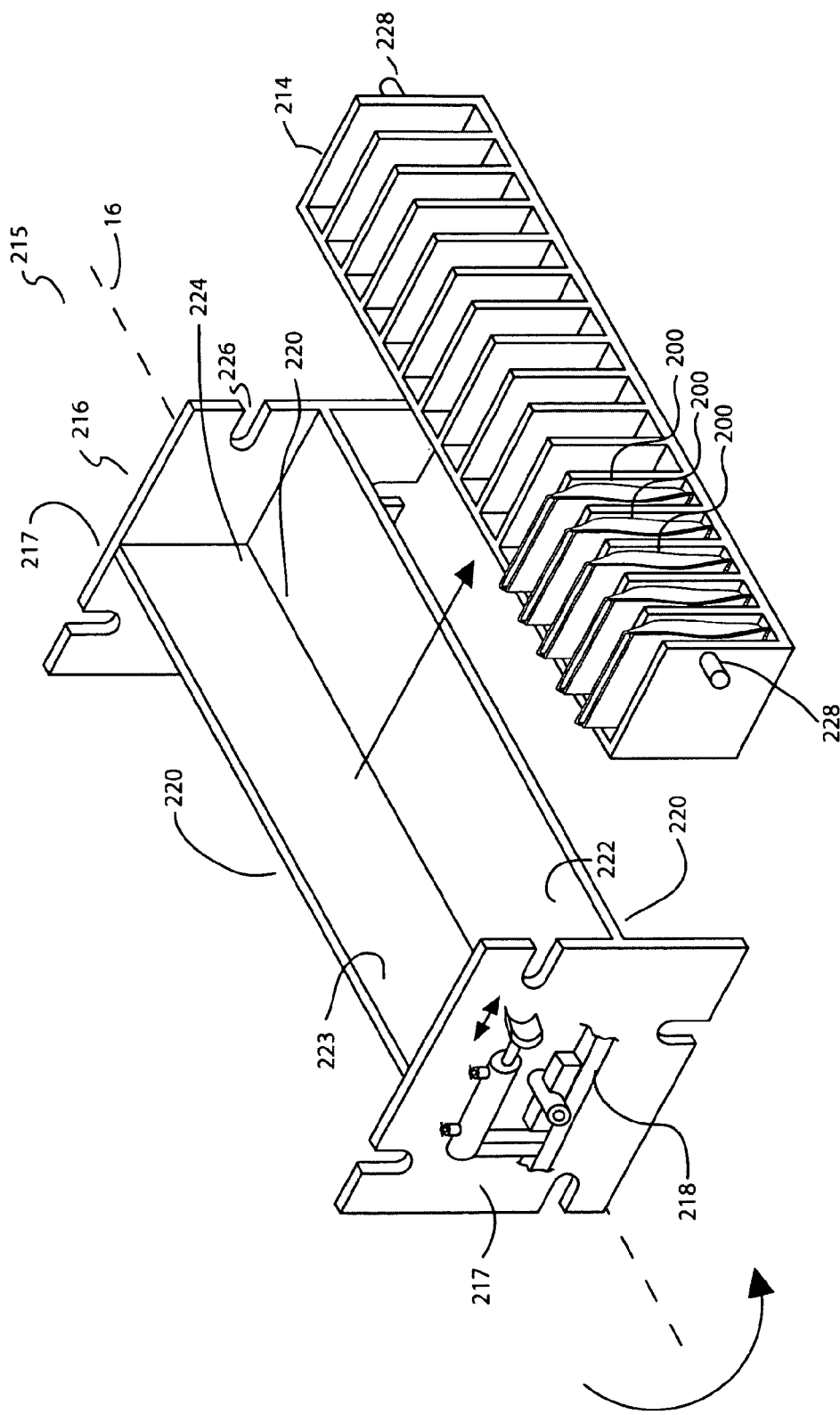
FIG. 25 is a perspective view of a housing receiving the cassette shown in FIG. 24; and, FIG. 26 is a perspective view of a portion of the cassette and housing shown in FIG. 25, being fed by the overhead feeding system shown in FIG. 13.

FIG. 25 shows a molding station 215 in accordance with another embodiment of the present invention. Station 215 includes a housing 216 and a housing support 218 (preferably provided on each opposed side 217). Station 25 may be adapted to receive one cassette 214. Preferably station 25 is configured to receive a plurality of cassettes 214 each of which is configured to receive a plurality of mold cavity enclosures 200. For example, as shown in FIG. 25, housing 216 may have a plurality of sides or compartments 220, each side 220 having a shelf 222 for supporting cassette 214. Each side 220 may optionally have a back 223, which facilitates the placement of all of the cassettes 214 in the same relative position on each shelf 222.

Housing 216 may be similar to housing 10 in that it may be rotatably supportable on housing support 218 for rotation about generally horizontal axis 16. Accordingly, the upper side of housing 216 is shown at 224, and is the side having a cassette 214 of mold cavity enclosures 200 positioned for removal or for filling with molding material. As housing 216 rotates about axis 16, a different cassette 214 on a different shelf 222 is presented for filling or removal. In particular, a new cassette having a plurality of mold cavity enclosures 200 may be positioned on shelf 222 when that shelf is the upper side 224. The mold cavities 200 may then be feed such as by an overhead feeding system 114. Housing 216 may then be rotated to present a new shelf 22 as the upper side 224. If this shelf holds a cassette with mold cavities that were previously filled, then this cassette with cured mold products 208 may be removed and a new cassette having a plurality of empty mold cavity enclosures 200 may be positioned on shelf 222 for filling. Once cassette is removed from shelf 222, mold cavities 200 may be opened to remove molded articles 208 therefrom. The mold cavities may then be closed and reinserted into cassette 214. Cassette is now ready for placement on a shelf 222. Once the mold cavities 200 in a cassette 214 are filled, the cassette is rotated, e.g., around 360 degrees until the cassette is again in the position of upper side 224 so that the cassette 214 may be removed from shelf 222 and molded articles 208 removed therefrom.

If housing 216 rotates as shown in FIG. 25, then housing 216 is adapted to lockingly receive cassette 214 and slot is adapted to lockingly receive mold cavities 200. For example sides 217 may have a slot 226 for receiving extension member 228 therein. A pivotal latch 230 that is secured in the closed position shown in FIG. 26 by releasable catch member 232 may be provided. Thus when cassette 214 is inverted during rotation of housing 216, it will be secured in shelf 222. In addition, shelf 222 may be configured so that cassette rotates about extension member 228 as housing 216 rotates. Thus, openings 210 will always extend upwardly as housing 216 rotates.

Figure 26:
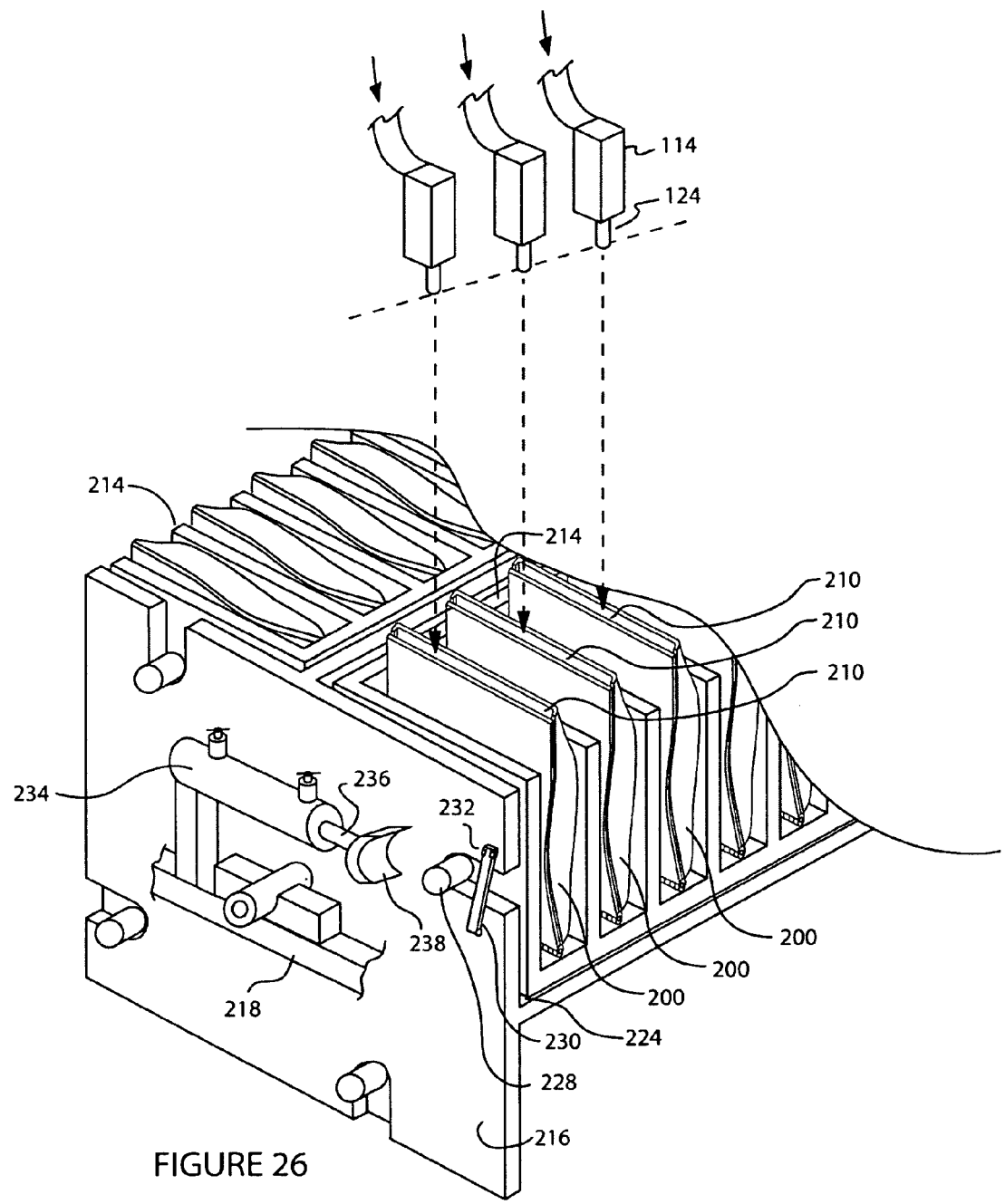

Referring to FIG. 26, cassette 214, having a plurality of mold cavity enclosures 200 therein, may be filled by overhead feeding system 114. Feeding system 114 can feed each of the mold cavity enclosures 200 in the cassette 214 that is on the upper side 224, sequentially. Alternatively, a feeding system having multiple outlets 124 can be used to increase the speed at which a complete cassette 214 of enclosures 200 can be filled. After a cassette 214 of enclosures 200 is filled, the molding material may be left to cure for a small period of time before housing 216 is rotated to present a new side 220 for cassette removal or filling.

In order to withdraw or assist in the withdrawal of cassette 214 from shelf 222, cylinder 234 is provided. Rod 236 is provided with curved member 238 for abutting extension member 228 and pushing cassette out of shelf 222.

While the above description constitutes the preferred embodiments, it will be appreciated that the present invention is susceptible to modification and change without departing from the fair meaning of the accompanying claims.

What is claimed is:

1. A molding station comprising:
   (a) a housing support; and,
   (b) a housing having a generally horizontal axis, a plurality of mold cavity enclosures and a plurality of sides, including an upper side, the housing being rotatably mounted to the housing support about the generally horizontal axis, the mold cavity enclosures being circumferentially positioned about the axis in at least some of the sides, each of the mold cavity enclosures defining at least one mold cavity having an opening and a lid, each mold cavity is positionable, as the housing is rotated about the axis, to be the upper side and each lid is openable when the respective mold cavity enclosure is positioned in the side of the housing which is then the upper side of the housing.

2. The molding station as claimed in claim 1 further comprising at least one temperature control device in thermal communication with at least some of the mold cavity enclosures.

3. The molding station as claimed in claim 1 wherein the opening is fillable from above when the lid is open.

4. A molding station comprising a housing having a generally horizontal axis, a plurality of mold cavity enclosures and a plurality of sides positioned around the generally horizontal axis, including an upper side, the housing being rotatably mounted to a housing support about the generally horizontal axis, the mold cavity enclosures being circumferentially positioned about the axis in at least some of the sides, each of the mold cavity enclosures defining at least one mold cavity, each mold cavity enclosure having an opening and an associated lid which is movably mounted between a first position wherein each lid closes a respective opening and a second position wherein access is provided to the respective at least one of the mold cavity enclosures, and the opening is accessible from above when the associated lid is in the open position and as the housing is rotated about the axis, each mold cavity is positionable to be the upper side and the molding station further comprises a lid opener, the opener opening a lid of a mold cavity enclosure when the respective mold cavity enclosure is positioned in the side of the housing which is then the upper side of the housing.

5. The molding station as claimed in claim 3 wherein each mold cavity enclosure includes a first mold portion and a second mold portion, the first mold portion is mounted to the housing and the second mold portion is mounted to the associated lid.

6. The molding station as claimed in claim 2 wherein the at least one temperature control device is in thermal communication with each mold cavity enclosure.

7. The molding station as claimed in claim 1 wherein each mold cavity enclosure comprises a single mold cavity.

8. The molding station as claimed in claim 1 wherein the housing has an upper side and as the housing is rotated about the axis, each side of the housing is positionable to be the upper side and the molding station further comprises a pressurized gas outlet positioned in a lower portion of a mold cavity enclosure when the mold cavity enclosure is positioned such that the mold cavity enclosure is provided in the then upper side of the housing, the pressurized gas outlet connected to a selectively activatable source of pressurized gas wherein a pressurized gas is injected into the mold cavity enclosure to loosen a molded product from the enclosure when the source is activated.

9. The molding station as claimed in claim 1 further comprising a flexible hose member connected to a selectively activatable source of pressurized gas wherein a pressurized gas is injected into the mold cavity enclosure to loosen a molded product from the enclosure when the source is activated.

10. The molding station as claimed in claim 2 wherein
    (a) the housing has an interior volume and two opposing side faces, at least one of the side faces having a passage to the interior volume from exterior of the housing, and,
    (b) the temperature control device includes a first portion that is positioned within the interior volume, and a second portion that is positioned outside of the housing, the first and second portions being connected to each other through the passage.

11. The molding station as claimed in claim 2 wherein the temperature control device is an electrical resistance heater including a heatable resistance element that is connectable to an electrical source through a passage in the housing.

12. The molding station as claimed in claim 10 wherein the temperature control system includes a fluid conduit passing into and out of the interior volume through the passage, the fluid conduit being adapted to transport fluid at a selected temperature, into and out of the interior volume, the fluid conduit having an inlet that is connectable to a source of fluid at the selected temperature and a fluid pump for moving the fluid through the conduit from the source.

13. A molding station comprising:
    (a) a plurality of housings, each housing having a generally horizontal axis, a plurality of mold cavity enclosures and a plurality of sides, each housing being rotatably mounted about the generally horizontal axis, the mold cavity enclosures being circumferentially positioned about the axis in at least some of the sides;
    (b), each of the housings is rotatable about the axis between a plurality of feeding positions wherein in each of the feeding positions at least one of the mold cavity enclosures is adapted to be filled; and,
    (c) an overhead feeding system, the overhead feeding system including a molding material transport conduit, the molding material transport conduit having an inlet and an outlet, the inlet being connectable to a source of molding material, the outlet being selectively positionable above each of the housings.

14. The molding station as claimed in claim 13 further comprises a control system, the control system being adapted to feed a selected amount of molding material from the outlet into a mold cavity enclosure when the housing is in one of the feeding positions and the overhead feeding system is positioned above the housing.

15. The molding station as claimed in claim 14 wherein the control system is adapted to rotate the housings around the axis between each feeding position and to move the overhead feeding system between each of the housings whereby the overhead feeding system fills one mold cavity enclosure in each housing before filling a second mold cavity enclosure in one of the housings.

16. The molding station as claimed in claim 14 wherein each housing is independently rotatable.

17. A molding station comprising:
    (a) a plurality of housings, each housing having a generally horizontal axis and a plurality of mold cavity enclosures circumferentially positioned about the axis, each of the housings is rotatable about its axis between a plurality of feeding positions wherein in each of the feeding positions at least one of the mold cavity enclosures is adapted to be filled from above; and, (b) an overhead feeding system, the overhead feeding system including a molding material transport conduit, the molding material transport conduit having an inlet and an outlet, the inlet being connectable to a source of molding material, the outlet being selectively positionable above each of the housings.

18. The molding station as claimed in claim 17 further comprising a control system, the control system being adapted to feed a selected amount of molding material from the outlet into a mold cavity enclosure when the housing is in one of the feeding positions and the overhead feeding system is positioned above the housing.

19. The molding station as claimed in claim 18 wherein the control system is adapted to rotate the housings around the axis between each feeding position and to move the overhead feeding system between each of the housings whereby the overhead feeding system fills one mold cavity enclosure in each housing before filling a second mold cavity enclosure in one of the housings.

20. The molding station as claimed in claim 17 wherein each housing is independently rotatable.

21. A molding station comprising:
  (a) housing means rotatably mounted about a generally horizontal axis and having a plurality of mold cavity means and a plurality of sides, the mold cavity means being circumferentially positioned about the axis in at least some of the sides; and,
  (b) temperature control means in thermal communication with at least some of the mold cavity means and having a portion that is positioned interior of the mold cavity means and is connected to a source of energy, the portion extending outwardly from the housing at a position adjacent the axis to connect with the source of energy.

22. The molding station as claimed in claim 21 wherein each mold cavity means has a lid that is openable to provide access to the mold cavity from above.

23. The molding station as claimed in claim 21 wherein the at least one temperature control means is in thermal communication with each mold cavity means.

24. The molding station as claimed in claim 21 further comprising pressurized gas delivery means provided in at least some of the mold cavity means.

25. The molding station as claimed in claim 21 wherein the temperature control means comprises a heat exchanger provided interior of the mold cavity means of a single housing means.

26. A molding station comprising:
  (a) a first housing means rotatably mounted about a generally horizontal axis and having a plurality of mold cavity means and a plurality of sides, the mold cavity means being circumferentially positioned about the axis in at least some of the sides;
  (b) temperature control means in thermal communication with at least some of the mold cavity means;
  (c) each mold cavity means having a lid that is openable to provide access to the mold cavity from above;
  (d) at least one additional housing means rotatable about a generally horizontal axis; and,
  (e) an overhead feeding means for filling a mold cavity means when the mold cavity means is open.

27. The molding station as claimed in claim 26 further comprising control means adapted to feed a selected amount of molding material from the overhead feeding means into a mold cavity means when the mold cavity means is open and the overhead feeding means is positioned above the open mold cavity means.

28. The molding station as claimed in claim 27 wherein the control means is adapted to rotate the housing means around the axis and to move the overhead feeding system between each of the housing means whereby the overhead feeding means fills one mold cavity means in each housing means before filling a second mold cavity means in one of the housings means.

29. The molding station as claimed in claim 27 wherein each housing means is independently rotatable.

30. A molding station comprising:
  (a) a plurality of housings, each housing being rotatably mounted about a generally horizontal axis that extends through the housing and having a plurality of mold cavities and a plurality of sides, the cavities being circumferentially positioned about the axis in at least some of the sides; and,
  (b) moveable overhead feeder whereby the overhead feeder is positionable to fill a selected mold cavity of a housing.

31. The molding station as claimed in claim 30 further comprising a controller adapted to feed a selected amount of molding material from the overhead feeder into a mold cavity when the mold cavity is open and the overhead feeder is positioned above the open mold cavity.

32. The molding station as claimed in claim 31 wherein the controller is adapted to rotate the housing around the axis and to move the overhead feeder between each housing whereby the overhead feeder fills one mold cavity in each housing before filling a second mold cavity in another one of the housings.

33. The molding station as claimed in claim 30 wherein each housing is independently rotatable.

* * * * *